(12) United States Patent
Fukuzawa

(10) Patent No.: US 7,977,828 B2
(45) Date of Patent: Jul. 12, 2011

(54) STEPPING MOTOR

(75) Inventor: Hisashi Fukuzawa, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/916,865

(22) Filed: Nov. 1, 2010

(65) Prior Publication Data

US 2011/0050009 A1 Mar. 3, 2011

Related U.S. Application Data

(63) Continuation of application No. PCT/JP2010/001524, filed on Mar. 4, 2010.

(30) Foreign Application Priority Data

Mar. 18, 2009 (JP) .................................. 2009-066371

(51) Int. Cl.
 *H02K 37/00* (2006.01)
(52) U.S. Cl. ..................... 310/49.16; 310/49.15; 310/257
(58) Field of Classification Search .................. 310/257, 310/49.15–49.17, 49.34–49.35
 See application file for complete search history.

(56) References Cited

U.S. PATENT DOCUMENTS

| | | | |
|---|---|---|---|
| 5,962,947 A * | 10/1999 | Suzuki et al. ................. | 310/257 |
| 6,031,304 A * | 2/2000 | Suzuki et al. ............. | 310/49.08 |
| 6,060,800 A * | 5/2000 | Suzuki et al. .............. | 310/49.16 |
| 6,486,576 B1 * | 11/2002 | Yura et al. .................. | 310/49.24 |
| 6,710,503 B2 * | 3/2004 | Yamawaki et al. .......... | 310/257 |
| 6,727,608 B2 * | 4/2004 | Yamawaki et al. ........ | 310/49.33 |
| 6,822,351 B2 * | 11/2004 | Matsushita et al. ........ | 310/49.36 |
| 7,015,604 B2 * | 3/2006 | Iwase et al. ................ | 310/49.36 |
| 7,193,340 B2 * | 3/2007 | Matsushita ................ | 310/49.35 |
| 7,714,475 B2 * | 5/2010 | Enomoto et al. ....... | 310/216.067 |
| 7,795,774 B2 * | 9/2010 | Enomoto et al. ............. | 310/257 |
| 7,843,106 B2 * | 11/2010 | Huang .......................... | 310/257 |

FOREIGN PATENT DOCUMENTS

| | | |
|---|---|---|
| JP | 59-191880 U | 12/1984 |
| JP | 3-112356 A | 5/1991 |
| JP | 6-178525 A | 6/1994 |
| JP | 2000-50536 A | 2/2000 |
| JP | 2006-280174 A | 10/2006 |

OTHER PUBLICATIONS

International Search Report for International Application No. PCT/JP2010/001524 with English translation mailed Jun. 1, 2010.

* cited by examiner

*Primary Examiner* — Thanh Lam
(74) *Attorney, Agent, or Firm* — Cantor Colburn LLP

(57) ABSTRACT

A stepping motor may include a rotor having a drive magnet and a stator having a drive coil wound in a tube shape and disposed on the drive magnet. The stator may include a first yoke, a second yoke, a plurality of first pole teeth provided in the first yoke, and a plurality of second pole teeth provided in the second yoke. The plurality of the first pole teeth and the second pole teeth may be alternately disposed in a circumferential direction of the rotor.

15 Claims, 10 Drawing Sheets

| Con. | Distance L9,L10[mm] | Distance L14,L15[mm] | Torque [mN·m] | Torque Ripple [mN·m] |
|---|---|---|---|---|
| 1 | 1.2 | 3.2 | 0.305 | 0.032 |
| 2 | 1.6 | 3.6 | 0.382 | 0.036 |
| 3 | 1.96 | 3.96 | 0.406 | 0.086 |
| 4 | 2.2 | 4.2 | 0.382 | 0.134 |

STEPPING MOTOR

CROSS REFERENCE TO RELATED APPLICATIONS

This is a Continuation Application of International Application No. PCT/JP2010/001524, filed on Mar. 4, 2010, the disclosure of which is incorporated herein by reference in its entirety. International Application No. PCT/JP2010/001524 claims priority to Japanese Patent Application No. 2009-066371, filed Mar. 18, 2009, priority to which is claimed herein and the contents of each of which are incorporated herein by reference.

TECHNICAL FIELD

The present invention relates to a stepping motor.

BACKGROUND

A stepping motor has been conventionally used as a motor in an optical pickup device which is used in a CD player and a DVD player or as a motor for moving a lens group used in a camera. As this type of a stepping motor, a stepping motor which is provided with pole teeth fixed to an outer yoke and pole teeth fixed to an inner yoke has been known (see, for example, Patent Literature 1).

In the stepping motor described in Patent Literature 1, the pole teeth fixed to the outer yoke and the pole teeth fixed to the inner yoke are alternately disposed in a circumferential direction of the rotor and the pole teeth are disposed so as to face an outer peripheral face of a drive magnet structuring the rotor. Further, in the stepping motor, the pole teeth are formed in a roughly trapezoid shape and spaces in the circumferential direction between the pole teeth fixed to the outer yoke and the pole teeth fixed to the inner yoke are set to be constant in an axial direction of the rotor.

PATENT LITERATURE

[PTL 1] Japanese Patent Laid-Open No. 2000-50536

In markets such as a CD player and a DVD player or a camera, the size of the device has been required to reduce in recent years and thus the size in the axial direction of a stepping motor mounted on the device is also required to reduce. On the other hand, the market requires that, even when the size in the axial direction of the stepping motor is reduced, the performance of the stepping motor is required to be similar to the motor before downsizing.

In view of the problem described above, at least an embodiment of the present invention provides a stepping motor in which lowering of its performance is restrained even when the size in the axial direction is reduced.

SUMMARY

In order to solve the problem, the present inventor has been performed various examinations and considerations. First, when the size of a conventional stepping motor is analogously reduced in an axial direction, the torque is lowered and thus a thickness of the pole tooth and the like is made thinner to increase the number of turns of the drive coil so that lowering of the torque is restrained. However, according to examinations and considerations of the present inventor, when a thickness of the pole tooth and the like is made thinner, a torque ripple becomes larger and a linearity characteristic is lowered. In other words, according to examinations and considerations of the present inventor, the present inventor has found that, in a case that a thickness of the pole tooth and the like is made thinner, even when a current-supply quantity to the drive coil is constant, a variation quantity of a torque in each step becomes larger and, as a result, steps are occurred in which a difference between a rotation quantity of a theoretical one (1) step and a rotation quantity of an actual one (1) step becomes larger.

Therefore, in order to restrain deterioration of the linearity characteristic, the present inventor has performed further examinations and considerations. As a result, the present inventor has found that, when a thickness of the pole tooth and the like is made thinner, magnetic saturation is occurred in portions of a base end part and a tip end part of the pole tooth where magnetic flux is concentrated. Further, the present inventor has found that, when a thickness of the pole teeth and the like is made thinner, magnetic saturation is occurred in portions of the base end part and the tip end part of the pole tooth where magnetic flux is excessively concentrated, which causes to deteriorate the linearity characteristic.

On the basis of the above-mentioned new findings, at least an embodiment of the present invention provides a stepping motor including a rotor having a drive magnet, and a stator having a drive coil which is wound around in a tube-like shape and disposed on an outer peripheral side of the drive magnet. The stator includes a first yoke which is provided with a first end plate part formed in a roughly ring shape and disposed so as to cover one end face of the drive coil in an axial direction of the rotor, and a second yoke which is provided with a second end plate part formed in a roughly ring shape and disposed so as to cover the other end face of the drive coil in the axial direction, a plurality of first pole teeth which is provided in the first yoke, formed to stand up from an inner peripheral end of the first end plate part, and disposed so as to face an outer peripheral face of the drive magnet, and a plurality of second pole teeth which is provided in the second yoke, formed to stand up from an inner peripheral end of the second end plate part, and disposed so as to face the outer peripheral face of the drive magnet. The plurality of the first pole teeth and the plurality of the second pole teeth are alternately disposed in a circumferential direction of the rotor, and a narrow space part where a space becomes narrower in the circumferential direction between the first pole tooth and the second pole tooth adjacent to each other in the circumferential direction is formed at a substantially center position in the axial direction between a first tip end part which is a tip end part of the first pole tooth and a second tip end part which is a tip end part of the second pole teeth. In addition, a distance between the first tip end part and the narrow space part in the axial direction is approximately $2/3$ of a distance in the axial direction between a second base end part, which is a base end part of the second pole tooth that is formed at a boundary part between the second end plate part and the second pole tooth, and the narrow space part, and a distance between the second tip end part and the narrow space part in the axial direction is approximately $2/3$ of a distance in the axial direction between a first base end part, which is a base end part of the first pole tooth that is formed at a boundary part between the first end plate part and the first pole tooth, and the narrow space part.

In the stepping motor of at least an embodiment of the present invention, a distance between the first tip end part and the narrow space part in the axial direction is approximately $2/3$ of a distance in the axial direction between the second base end part and the narrow space part, and a distance between the second tip end part and the narrow space part in the axial direction is approximately $2/3$ of a distance in the axial direction between the first base end part and the narrow space part.

Therefore, while securing facing areas of the first pole tooth and the second pole tooth to the drive magnet, a distance in the axial direction between the first base end part and the second tip end part and a distance in the axial direction between the second base end part and the first tip end part can be made relatively larger. Accordingly, while securing facing areas of the first pole tooth and the second pole tooth to the drive magnet, a distance in the axial direction from one end face of the drive magnet to the first base end part, a distance in the axial direction from the one end face of the drive magnet to the second tip end part, a distance in the axial direction from the other end face of the drive magnet to the second base end part, and/or a distance in the axial direction from the other end face of the drive magnet to the first tip end part can be made larger.

As a result, in at least an embodiment of the present invention, even when thicknesses of the first pole tooth, the second pole tooth and the like are made thinner and, in addition, facing areas of the first pole tooth and the second pole tooth to the drive magnet are secured, magnetic saturation in the portions of the first and the second base end parts and the first and the second tip end parts where magnetic flux is concentrated is restrained. In other words, in at least an embodiment of the present invention, even when lowering of a torque is restrained by means of that the first pole tooth, the second pole tooth and the like are made thinner to increase the number of turns of the drive coil and that the facing areas of the first pole tooth and the second pole tooth to the drive magnet are secured, magnetic saturation in the portions of the first and the second base end parts and the first and the second tip end parts where magnetic flux is concentrated is restrained to prevent from deteriorating of the linearity characteristic. Therefore, in at least an embodiment of the present invention, even when the size of the stepping motor is reduced in the axial direction, lowering of its performance is restrained.

Further, in at least an embodiment of the present invention, a narrow space part where a space becomes narrower in the circumferential direction between the first pole tooth and the second pole tooth adjacent to each other in the circumferential direction is formed at a substantially center position in the axial direction between the first tip end part and the second tip end part. Therefore, in comparison with a case that a space in the circumferential direction between the first pole tooth and the second pole tooth adjacent to each other in the circumferential direction is constant in the axial direction, a width of the first pole tooth and a width of the second pole tooth are wider in the narrow space part. Accordingly, in at least an embodiment of the present invention, the width of the first pole tooth and the width of the second pole tooth are wider in the portions where magnetic flux density becomes relatively higher and thus deterioration of a torque characteristic is restrained effectively.

In at least an embodiment of the present invention, it is preferable that the narrow space part is formed at a substantially center position between the first base end part and the second base end part in the axial direction, and a distance in the axial direction between one end face of the drive magnet and the first base end part is substantially equal to a distance in the axial direction between the other end face of the drive magnet and the second base end part. In other words, it is preferable that the first pole tooth and the second pole tooth are disposed in a substantially symmetrical manner with respect to the drive magnet. According to this structure, in comparison with a case that the first pole tooth and the second pole tooth are disposed in an asymmetrical manner with respect to the drive magnet, a torque ripple is made smaller effectively and deterioration of a linearity characteristic is restrained effectively.

Further, on the basis of the above-mentioned new findings, at least an embodiment of the present invention provides a stepping motor including a rotor having a drive magnet, and a stator having a drive coil which is wound around in a tube-like shape and disposed on an outer peripheral side of the drive magnet. The stator includes a first yoke which is provided with a first end plate part formed in a roughly ring shape and disposed so as to cover one end face of the drive coil in an axial direction of the rotor, a second yoke which is provided with a second end plate part formed in a roughly ring shape and disposed so as to cover the other end face of the drive coil in the axial direction, a plurality of first pole teeth which is provided in the first yoke, formed to stand up from an inner peripheral end of the first end plate part, and disposed so as to face an outer peripheral face of the drive magnet, and a plurality of second pole teeth which is provided in the second yoke, formed to stand up from an inner peripheral end of the second end plate part, and disposed so as to face the outer peripheral face of the drive magnet. The plurality of the first pole teeth and the plurality of the second pole teeth are alternately disposed in a circumferential direction of the rotor. Further, the first pole tooth is formed so that a width of the first pole tooth becomes narrower toward a first tip end part, which is a tip end part of the first pole tooth, from a first base end part which is a base end part of the first pole tooth that is formed at a boundary part between the first end plate part and the first pole tooth, and the second pole tooth is formed so that a width of the second pole tooth becomes narrower toward a second tip end part, which is a tip end part of the second pole tooth, from a second base end part which is a base end part of the second pole tooth that is formed at a boundary part between the second end plate part and the second pole tooth. The first pole tooth is structured of a first small width reducing rate part which is disposed on a base end side and in which a width of the first pole tooth is reduced toward a tip end side of the first pole tooth with a predetermined reducing rate, and a first large width reducing rate part which is disposed on a tip end side of the first pole tooth and in which the width of the first pole tooth is reduced toward the tip end side of the first pole tooth with a larger reducing rate than the predetermined reducing rate of the first small width reducing rate part. The second pole tooth is structured of a second small width reducing rate part which is disposed on a base end side and in which a width of the second pole tooth is reduced toward a tip end side of the second pole tooth with a predetermined reducing rate, and a second large width reducing rate part which is disposed on a tip end side of the second pole tooth and in which the width of the second pole tooth is reduced toward the tip end side of the second pole tooth with a larger reducing rate than the predetermined reducing rate of the second small width reducing rate part. A first width reducing rate change part, which is a boundary part between the first small width reducing rate part and the first large width reducing rate part, and a second width reducing rate change part, which is a boundary part between the second small width reducing rate part and the second large width reducing rate part, are disposed at approximately intermediate positions in the axial direction between the first tip end part and the second tip end part. Further, a distance in the axial direction between the first width reducing rate change part and the first tip end part is approximately $2/3$ of a distance in the axial direction between the first width reducing rate change part and the second base end part, and a distance in the axial direction between the second width reducing rate change part and the second tip end part is approximately $2/3$ of a distance in the axial direction between the second width reducing rate change part and the first base end part.

In the stepping motor of at least an embodiment of the present invention, a distance in the axial direction between the first width reducing rate change part and the first tip end part is approximately ⅔ of a distance in the axial direction between the first width reducing rate change part and the second base end part, and a distance in the axial direction between the second width reducing rate change part and the second tip end part is approximately ⅔ of a distance in the axial direction between the second width reducing rate change part and the first base end part. Therefore, while securing facing areas of the first pole tooth and the second pole tooth to the drive magnet, a distance in the axial direction between the first base end part and the second tip end part and a distance in the axial direction between the second base end part and the first tip end part can be made relatively larger. Accordingly, while securing facing areas of the first pole tooth and the second pole tooth to the drive magnet, a distance in the axial direction from one end face of the drive magnet to the first base end part, a distance in the axial direction from the one end face of the drive magnet to the second tip end part, a distance in the axial direction from the other end face of the drive magnet to the second base end part, and/or a distance in the axial direction from the other end face of the drive magnet to the first tip end part are made larger.

As a result, in at least an embodiment of the present invention, even when thicknesses of the first pole tooth, the second pole tooth and the like are made thinner and, in addition, facing areas of the first pole tooth and the second pole tooth to the drive magnet are secured, magnetic saturation in the portions of the first and the second base end parts and the first and the second tip end parts where magnetic flux is concentrated is restrained. In other words, in at least an embodiment of the present invention, even when lowering of a torque is restrained by means of that the first pole tooth, the second pole tooth and the like are made thinner to increase the number of turns of the drive coil and that the facing areas of the first pole tooth and the second pole tooth to the drive magnet are secured, magnetic saturation in the portions of the first and the second base end parts and the first and the second tip end parts where magnetic flux is concentrated is restrained to prevent from deteriorating of the linearity characteristic. Therefore, in at least an embodiment of the present invention, even when the size of the stepping motor is reduced in the axial direction, deterioration of its performance is restrained.

Further, in at least an embodiment of the present invention, the first pole tooth is structured of a first small width reducing rate part which is disposed on a base end side and a first large width reducing rate part which is disposed on a tip end side and the second pole tooth is structured of a second small width reducing rate part which is disposed on a base end side and a second large width reducing rate part which is disposed on a tip end side. Therefore, in comparison with a case that widths of the first and the second pole teeth are reduced from their base end sides to the tip end sides with a constant reducing rate, widths on the base end sides of the first and the second pole teeth are made wider while widths on the tip end sides of the first and the second pole teeth are made narrower. Accordingly, while restraining deterioration of torque ripples due to effects on the tip end sides of the first and the second pole teeth, magnetic saturation on the base end sides of the first and the second pole teeth is restrained and deterioration of torque ripples due to effects on the base end sides of the first and the second pole teeth is restrained. As a result, deterioration of the linearity characteristic is restrained effectively.

In at least an embodiment of the present invention, it is preferable that the first width reducing rate change part and the second width reducing rate change part are disposed at approximately intermediate positions between the first base end part and the second base end part in the axial direction, and a distance in the axial direction between the one end face of the drive magnet and the first base end part is substantially equal to a distance in the axial direction between the other end face of the drive magnet and the second base end part. In other words, it is preferable that the first pole tooth and the second pole tooth are disposed in an approximately symmetrical manner with respect to the drive magnet. According to this structure, in comparison with a case that the first pole tooth and the second pole tooth are disposed in an asymmetrical manner with respect to the drive magnet, a torque ripple is made smaller effectively and deterioration of a linearity characteristic is restrained effectively.

Further, on the basis of the above-mentioned new findings, at least an embodiment of the present invention provides a stepping motor including a rotor having a drive magnet, and a stator having a drive coil which is wound around in a tube-like shape and disposed on an outer peripheral side of the drive magnet. The stator includes a first yoke which is provided with a first end plate part formed in a roughly ring shape and disposed so as to cover one end face of the drive coil in an axial direction of the rotor, a second yoke which is provided with a second end plate part formed in a roughly ring shape and disposed so as to cover the other end face of the drive coil in the axial direction, a plurality of first pole teeth which is provided in the first yoke, formed to stand up from an inner peripheral end of the first end plate part, and disposed so as to face an outer peripheral face of the drive magnet, and a plurality of second pole teeth which is provided in the second yoke, formed to stand up from an inner peripheral end of the second end plate part, and disposed so as to face the outer peripheral face of the drive magnet. The plurality of the first pole teeth and the plurality of the second pole teeth are alternately disposed in a circumferential direction of the rotor, the first pole tooth is formed so that a width of the first pole tooth becomes narrower toward a first tip end part, which is a tip end part of the first pole tooth, from a first base end part which is a base end part of the first pole tooth that is formed at a boundary part between the first end plate part and the first pole tooth, and the second pole tooth is formed so that a width of the second pole tooth becomes narrower toward a second tip end part, which is a tip end part of the second pole tooth, from a second base end part which is a base end part of the second pole tooth that is formed at a boundary part between the second end plate part and the second pole tooth. Further, the first pole tooth is structured of a first small width reducing rate part which is disposed on a base end side and in which a width of the first pole tooth is reduced toward a tip end side of the first pole tooth with a predetermined reducing rate, and a first large width reducing rate part which is disposed on a tip end side of the first pole tooth and in which the width of the first pole tooth is reduced toward the tip end side of the first pole tooth with a larger reducing rate than the predetermined reducing rate of the first small width reducing rate part. The second pole tooth is structured of a second small width reducing rate part which is disposed on a base end side and in which a width of the second pole tooth is reduced toward a tip end side of the second pole tooth with a predetermined reducing rate, and a second large width reducing rate part which is disposed on a tip end side of the second pole tooth and in which the width of the second pole tooth is reduced toward the tip end side of the second pole tooth with a larger reducing rate than the predetermined reducing rate of the second small width reducing rate part. In addition, a first width reducing rate change part which is a boundary part between the first small width reducing rate part and the first large width reducing rate part is disposed on a first base end part side with respect to a first center position which is a center position between the first base end part and the second base end part in the axial direction, and a second width reducing rate change part which is a boundary part between the second small width reducing rate part and the second large width reducing rate part is disposed on a second base end part side with respect to the first center position.

In the stepping motor in at least an embodiment of the present invention, the first width reducing rate change part is disposed on the first base end part side with respect to the first center position. Therefore, in comparison with a case that the first width reducing rate change part is disposed on the first tip end part side with respect to the first center position, magnetic saturation is restrained in the portion of the first base end part where magnetic flux is concentrated. Further, in at least an embodiment of the present invention, since the second width reducing rate change part is disposed on the second base end part side with respect to the first center position, in comparison with a case that the second width reducing rate change part is disposed on the second tip end part side with respect to the first center position, magnetic saturation is restrained in the portion of the second base end part where magnetic flux is concentrated. Therefore, in at least an embodiment of the present invention, even when lowering of a torque is restrained by means of that the first pole tooth, the second pole tooth and the like are made thinner to increase the number of turns of the drive coil, magnetic saturations in the portions of the first and the second base end parts where magnetic flux is concentrated are restrained to prevent a linearity characteristic from deteriorating. Accordingly, in at least an embodiment of the present invention, even when the size of the stepping motor is reduced in the axial direction, deterioration of its performance is restrained.

In at least an embodiment of the present invention, it is preferable that the first width reducing rate change part is disposed on a first tip end part side with respect to a second center position which is a center position between the first center position and the second tip end part in the axial direction, and the second width reducing rate change part is disposed on a second tip end part side with respect to a third center position which is a center position between the first center position and the first tip end part in the axial direction. According to this structure, even when the first width reducing rate change part is disposed on the first base end part side with respect to the first center position and the second width reducing rate change part is disposed on the second base end part side with respect to the first center position, facing areas of the first pole tooth and the second pole tooth to the drive magnet are secured and lowering of a torque is restrained.

In at least an embodiment of the present invention, it is preferable that a region in the axial direction between the first width reducing rate change part and the second width reducing rate change part is a narrow space part where a space in the circumferential direction between the first pole tooth and the second pole tooth adjacent to each other in the circumferential direction is narrower. According to this structure, the width of the first pole tooth and the width of the second pole tooth become wider in the narrow space part and thus the width of the first pole tooth and the width of the second pole tooth can be made wider in the portions where magnetic flux density is relatively higher. Therefore, deterioration of a torque characteristic can be restrained effectively.

In at least an embodiment of the present invention, it is preferable that a distance in the axial direction between the first width reducing rate change part and the first tip end part is approximately ⅔ of a distance in the axial direction between the first width reducing rate change part and the second base end part, and a distance in the axial direction between the second width reducing rate change part and the second tip end part is approximately ⅔ of a distance in the axial direction between the second width reducing rate change part and the first base end part. According to this structure, while securing facing areas of the first pole tooth and the second pole tooth to the drive magnet, a distance in the axial direction between the first base end part and the second tip end part and a distance in the axial direction between the second base end part and the first tip end part are relatively made larger. Therefore, as described above, even when thicknesses of the first pole tooth, the second pole tooth and the like are made thinner and, in addition, facing areas of the first pole tooth and the second pole tooth to the drive magnet are secured, magnetic saturation in the portions of the first and the second base end parts and the first and the second tip end parts where magnetic flux is concentrated are restrained.

In at least an embodiment of the present invention, it is preferable that a distance in the axial direction between the first width reducing rate change part and the first center position is substantially equal to a distance in the axial direction between the second width reducing rate change part and the first center position, and a distance in the axial direction between one end face of the drive magnet and the first base end part is substantially equal to a distance in the axial direction between the other end face of the drive magnet and the second base end part. In other words, it is preferable that the first pole tooth and the second pole tooth are disposed in a substantially symmetrical manner with respect to the drive magnet. According to this structure, in comparison with a case that the first pole teeth and the second pole teeth are disposed in an asymmetrical manner with respect to the drive magnet, a torque ripple is made smaller effectively and deterioration of a linearity characteristic is restrained effectively.

In at least an embodiment of the present invention, it is preferable that one end face of the drive magnet in the axial direction is disposed between the first base end part and the second tip end part in the axial direction, the other end face of the drive magnet in the axial direction is disposed between the second base end part and the first tip end part in the axial direction, and the first tip end part and the second tip end part are formed in a convex curved shape. According to this structure, the first base end part and the second tip end part are disposed in a well-balanced separated manner from the one end face of the drive magnet and the second base end part and the first tip end part are disposed in a well-balanced separated manner from the other end face of the drive magnet. Therefore, even when thicknesses of the first pole tooth, the second pole tooth and the like are made thinner, magnetic saturation in the portions of the first and the second base end parts and the first and the second tip end parts where magnetic flux is concentrated is restrained. Further, according to this structure, the first tip end part and the second tip end part are formed in a convex curved shape and thus concentration of magnetic flux on the first and the second tip end parts is restrained effectively. Therefore, even when lowering of a torque is restrained by means of that the first pole tooth, the second pole tooth and the like are made thinner to increase the number of turns of the drive coil, magnetic saturations in the portions of the first and the second base end parts and the first and the second tip end parts where magnetic flux is concentrated are restrained to prevent a linearity characteristic from deteriorating. Further, according to this structure, since the first tip end part and the second tip end part are formed in a convex curved shape, even when the first and the second tip end parts are relatively brought close to the one end face or the other end face of the drive magnet, concentration of magnetic flux on the first and the second tip end parts are restrained. Therefore, while restraining concentrations of the magnetic flux on the first and the second tip end parts, an effective magnetic circuit is formed and lowering of torque is restrained efficiently.

In at least an embodiment of the present invention, it is preferable that one end face of the drive magnet in the axial direction is disposed between the first base end part and the second tip end part in the axial direction, a distance in the axial direction between the one end face of the drive magnet and the first base end part is shorter than a distance in the axial direction between the one end face of the drive magnet and the second tip end part, the other end face of the drive magnet in the axial direction is disposed between the second base end part and the first tip end part in the axial direction, and a distance in the axial direction between the other end face of the drive magnet and the second base end part is shorter than a distance in the axial direction between the other end face of the drive magnet and the first tip end part. According to this structure, the first base end part and the second tip end part are disposed in a well-balanced separated manner from the one end face of the drive magnet and the second base end part and the first tip end part are disposed in a well-balanced separated manner from the other end face of the drive magnet. Therefore, even when thicknesses of the first pole tooth, the second pole tooth and the like are made thinner, magnetic saturation in the portions of the first and the second base end parts and the first and the second tip end parts where magnetic flux is concentrated is restrained. Further, according to this structure, in comparison with a case that a distance in the axial direction between the one end face of the drive magnet and the first base end part is longer than a distance in the axial direction between the one end face of the drive magnet and the second tip end part and that a distance in the axial direction between the other end face of the drive magnet and the second base end part is longer than a distance in the axial direction between the other end face of the drive magnet and the first tip end part, lengths in the axial direction of the first and the second pole teeth are shortened. Therefore, the size of the stepping motor can be reduced in the axial direction.

In at least an embodiment of the present invention, it is preferable that one end face of the drive magnet in the axial direction is disposed between the first base end part and the second tip end part in the axial direction, the other end face of the drive magnet in the axial direction is disposed between the second base end part and the first tip end part in the axial direction, a distance in the axial direction between the first base end part and the second tip end part is substantially equal to a distance in the axial direction between the second base end part and the first tip end part, and a distance in the axial direction between the one end face of the drive magnet and the first base end part is substantially equal to a distance in the axial direction between the other end face of the drive magnet and the second base end part. According to this structure, the first base end part and the second tip end part are disposed in a well-balanced separated manner from the one end face of the drive magnet and the second base end part and the first tip end part are disposed in a well-balanced separated manner from the other end face of the drive magnet. Therefore, even when thicknesses of the first pole tooth, the second pole tooth and the like are made thinner, magnetic saturation in the portions of the first and the second base end parts and the first and the second tip end parts where magnetic flux is concentrated is restrained. Further, according to this structure, the first pole tooth and the second pole tooth are disposed in a substantially symmetrical manner with respect to the drive magnet and thus, in comparison with a case that the first pole tooth and the second pole tooth are disposed in an asymmetrical manner with respect to the drive magnet, a torque ripple is made smaller effectively and deterioration of a linearity characteristic is restrained effectively.

In at least an embodiment of the present invention, the stator is, for example, provided with a plurality of stator assemblies having the drive coil, the first yoke and the second yoke, and the stator assemblies are disposed so as to superpose on each other in the axial direction.

As described above, in at least an embodiment of the present invention, even when the size of the stepping motor is reduced in the axial direction, deterioration of its performance is restrained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 3(A) is its plan view and FIG. 3(B) is a cross-sectional view showing the outer yoke which is cut by the "F-F" line in FIG. 3(A).

FIG. 4(A) is its plan view and FIG. 4(B) is a cross-sectional view showing the inner yoke which is cut by the "G-G" line in FIG. 4(A).

DESCRIPTION OF EMBODIMENTS

Embodiments of the present invention will be described below with reference to the accompanying drawings.
(Schematic Structure of Stepping Motor)

Figure 1:
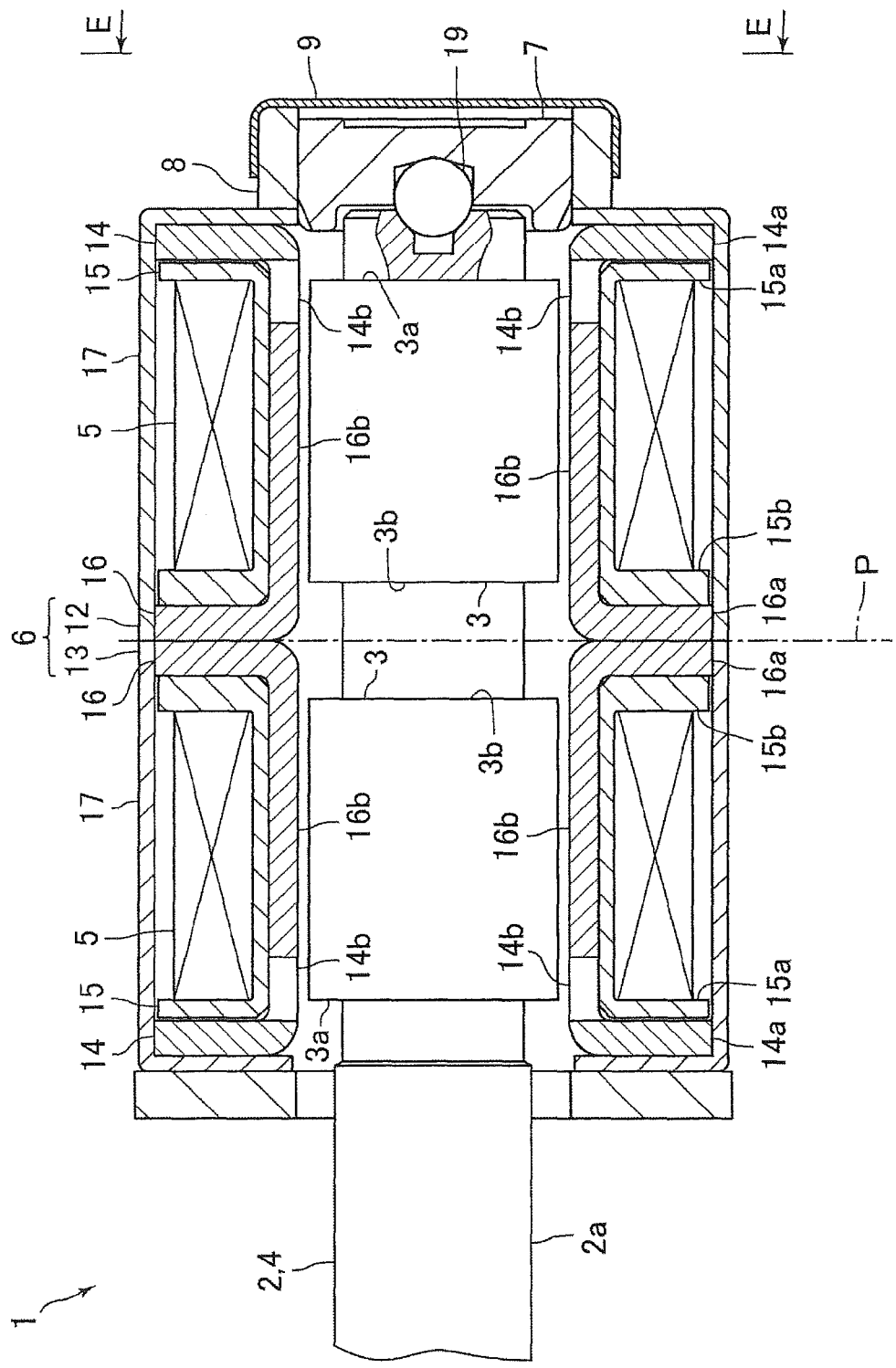
FIG. 1 is a cross-sectional view showing a stepping motor in accordance with an embodiment of the present invention.

FIG. 1 is a cross-sectional view showing a stepping motor 1 in accordance with an embodiment of the present invention.

Figure 2:
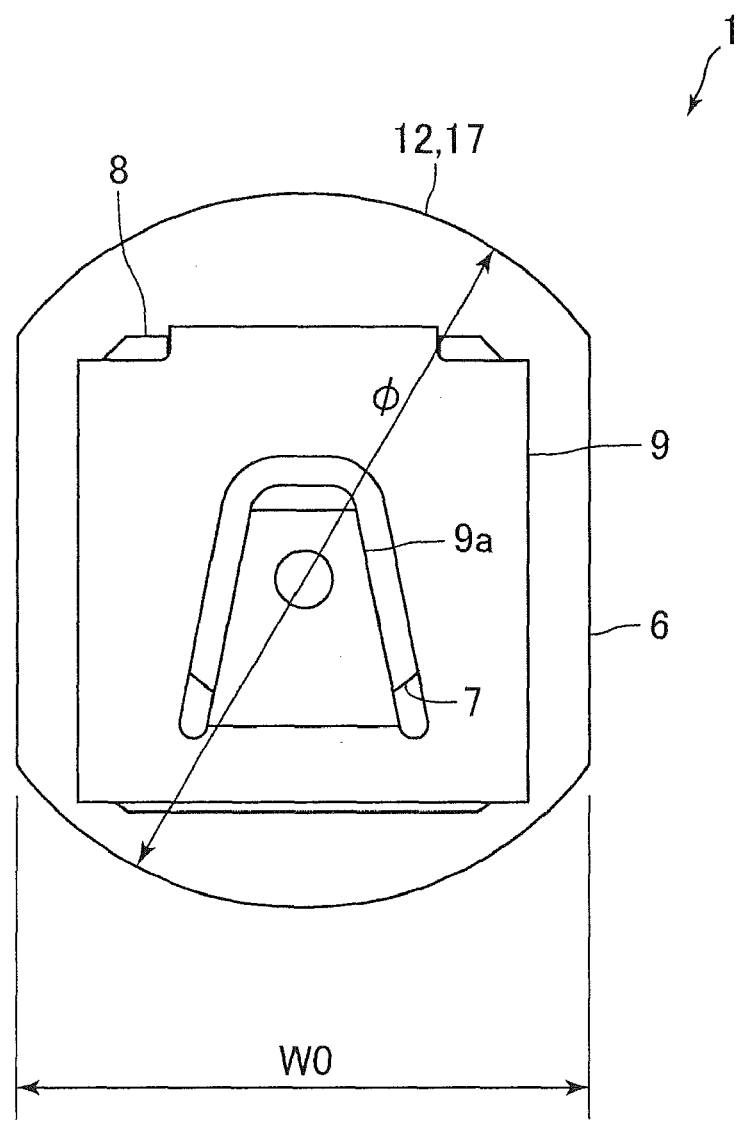
FIG. 2 is a view showing the stepping motor which is viewed in the "E-E" direction in FIG. 1.
Figure 3A:
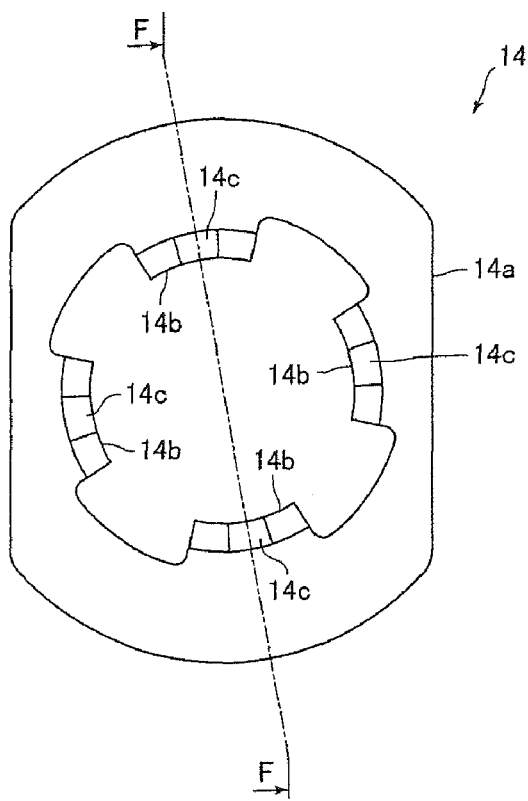
FIGS. 3(A) and 3(B) are views showing an outer yoke in FIG. 1.
Figure 3B:
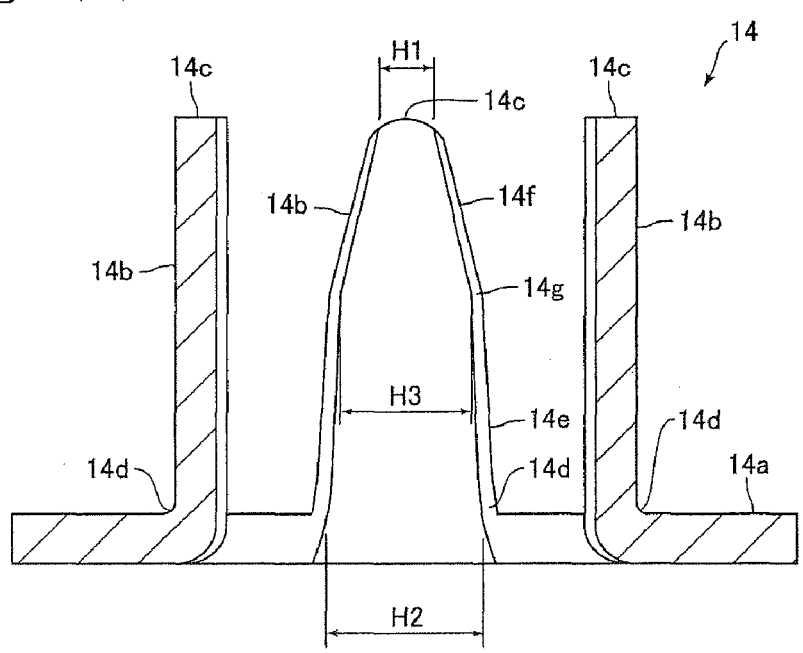
Figure 4A:
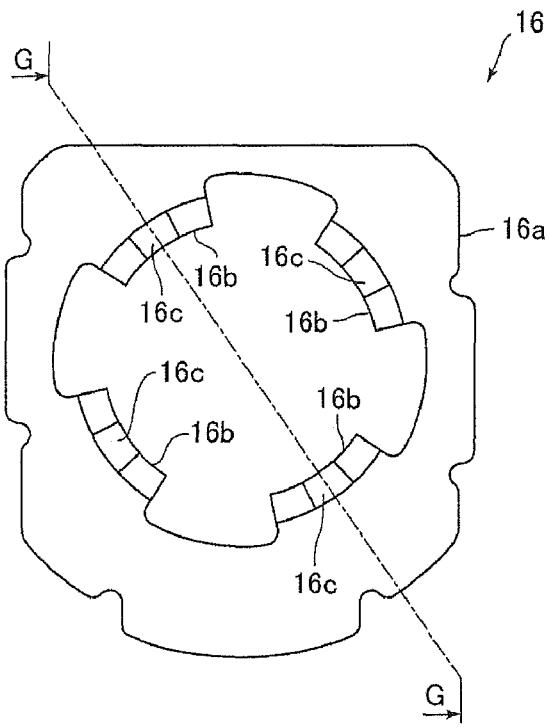
FIGS. 4(A) and 4(B) are views showing an inner yoke in FIG. 1.
Figure 4B:
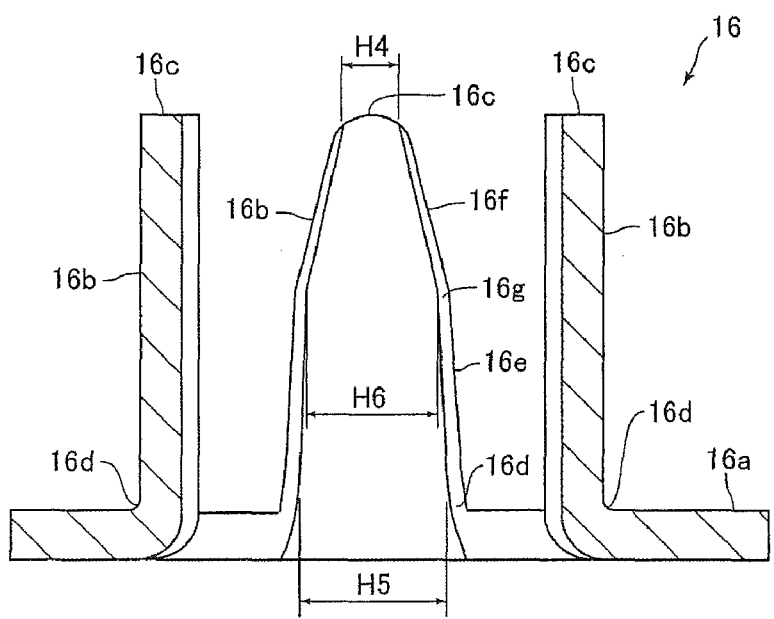

FIG. 2 is a view showing the stepping motor 1 which is viewed in the "E-E" direction in FIG. 1. FIGS. 3(A) and 3(B) are views showing an outer yoke 14 in FIG. 1. FIG. 3(A) is its plan view and FIG. 3(B) is a cross-sectional view showing the outer yoke 14 which is cut by the "F-F" line in FIG. 3(A). FIGS. 4(A) and 4(B) are views showing an inner yoke 16 in FIG. 1. FIG. 4(A) is its plan view and FIG. 4(B) is a cross-sectional view showing the inner yoke 16 which is cut by the "G-G" line in FIG. 4(A).

A stepping motor 1 in this embodiment (hereinafter, referred to as a "motor 1") is a so-called PM type stepping motor. The motor 1 is, as shown in FIG. 1, provided with a rotor 4 having a rotation shaft 2 and two drive magnets 3 and a stator 6 having two drive coils 5 which are disposed on outer peripheral sides of the drive magnets 3. Further, the motor 1 is provided with a bearing (not shown) which supports an end part (not shown) on an output side of the rotation shaft 2, a bearing 7 which supports an end part on an opposite-to-output side of the rotation shaft 2, a bearing holding member 8 which holds the bearing 7, and a flat spring 9 for urging the rotation shaft 2 to the output side.

In the following descriptions, the left side in FIG. 1 which is the output side of the rotation shaft 2 is the "output side" and the right side in FIG. 1 which is the opposite-to-output side of the rotation shaft 2 is the "opposite-to-output side". Further, the right and left direction in FIG. 1 which is an axial direction of the rotation shaft 2 is the "axial direction", the direction perpendicular to the axial direction is the "radial direction" and the circumferential direction of the rotor 4 is the "circumferential direction".

The rotation shaft 2 is formed of metal such as stainless steel, aluminum or brass. The output side of the rotation shaft 2 is protruded from the stator 6 and a portion which is protruded from the stator 6 is formed with a lead screw 2a. The lead screw 2a is threadedly engaged, for example, with a moved body (body to be moved) such as an optical pickup device to move the moved body.

The drive magnet 3 is a permanent magnet, which is formed in a substantially cylindrical tube shape. Two drive magnets 3 are fixed to an opposite-to-output side of the rotation shaft 2 with a predetermined space in an axial direction between the two drive magnets 3. Specifically, the two drive magnets 3 are disposed in a substantially plane symmetrical manner with respect to a plane "P" which passes through a substantially center in the axial direction of the stator 6. An "N"-pole and an "S"-pole are alternately formed on the outer peripheral face of the drive magnet 3 along the circumferential direction. Widths in the circumferential direction of the "N"-pole and the "S"-pole which are alternately formed on the outer peripheral face of the drive magnet 3 are, for example, are set to be substantially equal to the arrangement pitches in the circumferential direction of pole teeth 14b and 16b described later which are alternately disposed in the circumferential direction.

The stator 6 is provided with a first stator assembly 12 and a second stator assembly 13. The first stator assembly 12 and the second stator assembly 13 are disposed to superpose on each other in the axial direction.

The first stator assembly 12 is provided with an outer yoke 14, a bobbin 15 around which a drive coil 5 is wound, an inner yoke 16 which is disposed so as to sandwich the bobbin 15 between the outer yoke 14 and the inner yoke 16, and a case member 17 which covers these structures from an outer side in the radial direction and from the opposite-to-output side. The first stator assembly 12 is disposed on the outer side in the radial direction of the drive magnet 3 which is disposed on the opposite-to-output side.

The bobbin 15 is formed in a tube-like shape having flanges and the flange parts 15a and 15b are formed at both ends in the axial direction of the bobbin 15. In this embodiment, as shown in FIG. 1, a thickness (thickness in the axial direction) of the flange part 15a disposed on the output side is set to be thinner than a thickness of the flange part 15b disposed on the opposite-to-output side. The drive coil 5 is wound around the outer peripheral side of the bobbin 15. In other words, the drive coil 5 is wound around in a tube-like shape such as a cylindrical tube shape.

The outer yoke 14 is, as shown in FIGS. 3(A) and 3(B), provided with an end plate part 14a, which is formed in a roughly ring shape, and a plurality of the pole teeth 14b which are formed so as to stand up in the axial direction from an inner peripheral end of the end plate part 14a and disposed with a predetermined pitch in the circumferential direction. The inner yoke 16 is, as shown in FIGS. 4(A) and 4(B), provided with an end plate part 16a, which is formed in a roughly ring shape, and a plurality of the pole teeth 16b which are formed so as to stand up in the axial direction from an inner peripheral end of the end plate part 16a and disposed with a predetermined pitch in the circumferential direction. In this embodiment, the outer yoke 14 is provided with four pole teeth 14b and the four pole teeth 14b are disposed with a substantially 90° pitch. Further, the inner yoke 16 is provided with four pole teeth 16b and the four pole teeth 16b are disposed with a substantially 90° pitch.

The end plate part 14a of the outer yoke 14 is disposed so as to cover an end face on the opposite-to-output side of the drive coil 5, and the end plate part 16a of the inner yoke 16 is disposed so as to cover an end face on the output side of the drive coil 5. In other words, the drive coil 5 is sandwiched by the end plate part 14a and the end plate part 16a in the axial direction. Specifically, the end plate part 14a is disposed so as to cover an opposite-to-output side face of the flange part 15a of the bobbin 15, and the end plate part 16a is disposed so as to cover an output side face of the flange part 15b of the bobbin 15. In this manner, the bobbin 15 is sandwiched by the end plate part 14a and the end plate part 16a in the axial direction.

The pole teeth 14b and 16b are disposed so as to face the outer peripheral face of the drive magnet 3. Further, the pole teeth 14b and the pole teeth 16b are alternately disposed so as to be adjacent to each other in the circumferential direction. In other words, the pole teeth 14b and the pole teeth 16b are disposed so that the pole teeth 16b are respectively disposed between four pole teeth 14b from the output side and the pole teeth 14b are respectively disposed between four pole teeth 16b from the opposite-to-output side. Further, the bobbin 15 around which the drive coil 5 is wound is disposed on the outer side in the radial direction of the pole teeth 14b and 16b.

A further specific structure of the outer yoke 14 and the inner yoke 16, a further specific arranging relationship between the pole teeth 14b and 16b, and an arranging relationship in the axial direction between the drive magnet 3 and the pole teeth 14b and 16b will be described below.

The second stator assembly 13 is structured so that the same structure as the first stator assembly 12 is disposed symmetrically with respect to the plane "P" which passes through substantially the center in the axial direction of the stator 6. In other words, similarly to the first stator assembly 12, the second stator assembly 13 is provided with an outer yoke 14, a bobbin 15 around which a drive coil 5 is wound, an inner yoke 16 and a case member 17. As shown in FIG. 1, the output side face of the end plate part 16a of inner yoke 16 which structures the first stator assembly 12 is abutted on the plane "P" with an opposite-to-output side face of the end plate part 16a of the inner yoke 16 which structures the second stator assembly 13. Therefore, detailed description of the structure of the second stator assembly 13 is omitted.

A bearing holding member 8 is formed in a substantially tube-like shape and fixed to an end face on the opposite-to-output side of the first stator assembly 12. In other words, the bearing holding member 8 is fixed to an end face on the opposite-to-output side of the case member 17 of the first stator assembly 12. A bearing 7 is held by an inner peripheral face of the bearing holding member 8 so as to be movable in the axial direction. The bearing 7 is formed with a recessed part in which a ball-shaped pivot 19 is disposed. Further, an end face on the opposite-to-output side of the rotation shaft 2 is formed with a recessed part in which the pivot 19 is disposed.

A flat spring 9 is fixed to an opposite-to-output side face of the bearing holding member 8. As shown in FIG. 2, a center part of the flat spring 9 is formed with a spring part 9a which is abutted with the bearing 7. The spring part 9a urges the rotation shaft 2 to the output side through the bearing 7 and the pivot 19. In this embodiment, an opposite-to-output side end of the rotor 4 is supported by the bearing 7, the bearing holding member 8, the flat spring 9 and the pivot 19 in the radial direction and the thrust direction.

In this embodiment, an end part on the output side of the bearing 7 which is urged by the spring part 9a is, as shown in FIG. 1, disposed on the output side with respect to the end face on the opposite-to-output side of the case member 17 of the first stator assembly 12. In other words, the end part on the output side of the bearing 7 is disposed in the inside of the stator 6.

A shape of the motor 1 when viewed in the axial direction is, as shown in FIG. 2, a roughly oval shape. Specifically, a shape of the motor 1 when viewed in the axial direction is a roughly oval shape which is formed by two circular arc portions having the same radius of curvature and the same center of curvature and two flat faces parallel to each other in the upper and lower direction in FIG. 2. Therefore, in comparison with a motor whose shape when viewed in the axial direction is circular, in this embodiment, the size of the motor 1 is reduced in the right and left direction in FIG. 2. For example, the outer diameter "φ" of the motor 1 is 7.5 mm and the width "W0" of the motor 1 in the right and left direction in FIG. 2 is 6 mm. Further, in this embodiment, both side faces in the right and left direction of the drive coil 5 are covered by the case member 17 in FIG. 2. In other words, the drive coil 5 is covered by the case member 17 over its entire periphery.

(Structure of Outer Yoke and Inner Yoke)

As described above, the outer yoke 14 is provided with the end plate part 14a and four pole teeth 14b. As shown in FIG. 3(B), a tip end part 14c of the pole tooth 14b is formed in a convex curved shape. Specifically, the tip end part 14c is formed in a convex curved shape whose shape viewed in the radial direction is formed in an approximately one-quarter (¼) circular arc shape.

Further, as shown in FIG. 3(B), the pole tooth 14b is formed so that its width (specifically, width in the circumferential direction) becomes narrower as going from a base end part 14d of the pole tooth 14b, which is formed at a boundary part between the end plate part 14a and the pole tooth 14b, to the tip end part 14c. Specifically, at first, the width of the pole tooth 14b is extremely gradually reduced from the base end part 14d toward the tip end part 14c and, after that, the width of the pole tooth 14b is gradually reduced. The pole tooth 14b is formed so that its shape when viewed in the radial direction is a roughly pentagonal shape or a roughly hexagonal shape.

In other words, the pole tooth 14b in this embodiment is structured of a small width reducing rate part 14e, which is disposed on the base end side of the pole tooth 14b and where a width of the pole tooth 14b is decreased with a predetermined reducing rate toward the tip end side of the pole tooth 14b, and a large width reducing rate part 14f which is disposed on the tip end side of the pole tooth 14b and where the width of the pole tooth 14b is decreased toward the tip end side of the pole tooth 14b with a larger reducing rate which is larger than that of the small width reducing rate part 14e. A boundary part between the small width reducing rate part 14e and the large width reducing rate part 14f is a width reducing rate change part 14g where the reducing rate of the width of the pole tooth 14b is changed.

The small width reducing rate part 14e is formed so that the width of the pole tooth 14b becomes narrower by the same quantity from both sides in the circumferential direction toward the tip end side of the pole tooth 14b. Further, both end parts in the circumferential direction of the small width reducing rate part 14e are formed so that their shapes viewed in the radial direction are formed in straight line shapes which are inclined with respect to the axial direction (upper and lower direction in FIG. 3(B)). In the small width reducing rate part 14e, the width of the pole tooth 14b becomes gradually narrower toward the tip end side of the pole tooth 14b.

The large width reducing rate part 14f is formed so that the width of the pole tooth 14b becomes narrower by the same quantity from both sides in the circumferential direction toward the tip end side of the pole tooth 14b. Further, both end parts in the circumferential direction of the large width reducing rate part 14f are formed so that their shapes viewed in the radial direction are formed in straight line shapes which are inclined with respect to the axial direction. In the large width reducing rate part 14f, the width of the pole tooth 14b becomes gradually narrower toward the tip end side of the pole tooth 14b. Further, the inclinations with respect to the axial direction of both end parts in the circumferential direction of the large width reducing rate part 14f when viewed in the radial direction are set to be larger than the inclinations with respect to the axial direction of both end parts in the circumferential direction of the small width reducing rate part 14e when viewed in the radial direction.

As described above, the inner yoke 16 is provided with the end plate part 16a and four pole teeth 16b. In this embodiment, the pole tooth 16b is formed to be the same shape as the pole tooth 14b of the outer yoke 14. Specifically, the tip end part 16c of the pole tooth 16b is formed in a convex curved shape whose shape viewed in the radial direction is formed in an approximately one-quarter (¼) circular arc shape as shown in FIG. 4(B).

Further, as shown in FIG. 4(B), the pole tooth 16b is formed so that its width becomes narrower as going from a base end part 16d of the pole tooth 16b which is formed at a boundary part between the end plate part 16a and the pole tooth 16b to the tip end part 16c. Specifically, the width of the pole tooth 16b is extremely gradually reduced at first from the base end part 16d toward the tip end part 16c and, after that, the width of the pole tooth 16b is gradually reduced. The pole tooth 16b is formed so that its shape when viewed in the radial direction is a roughly pentagonal shape or a roughly hexagonal shape.

In other words, the pole tooth 16b is structured of a small width reducing rate part 16e, which is disposed on the base end side of the pole tooth 16b and where a width of the pole tooth 16b is decreased with a predetermined reducing rate toward the tip end side of the pole tooth 16b, and a large width reducing rate part 16f which is disposed on the tip end side of the pole tooth 16b and where the width of the pole tooth 16b is decreased toward the tip end side of the pole tooth 16b with a larger reducing rate which is larger than that of the small width reducing rate part 16e. A boundary part between the small width reducing rate part 16e and the large width reducing rate part 16f is a width reducing rate change part 16g where the reducing rate of the width of the pole tooth 16b is changed.

Similarly to the small width reducing rate part 14e, the small width reducing rate part 16e is formed so that the width of the pole tooth 16b becomes narrower by the same quantity from both sides in the circumferential direction toward the tip end side of the pole tooth 16b. Further, both end parts in the circumferential direction of the small width reducing rate part 16e are formed so that their shapes viewed in the radial direction are formed in straight line shapes which are inclined with respect to the axial direction (upper and lower direction in FIG. 4(B)).

Similarly to the large width reducing rate part 14f, the large width reducing rate part 16f is formed so that the width of the pole tooth 16b becomes narrower by the same quantity from both sides in the circumferential direction toward the tip end side of the pole tooth 16b. Further, both end parts in the circumferential direction of the large width reducing rate part 16f are formed so that their shapes viewed in the radial direction are formed in straight line shapes which are inclined with respect to the axial direction. Further, the inclinations with respect to the axial direction of both end parts in the circumferential direction of the large width reducing rate part 16f when viewed in the radial direction are set to be larger than the inclinations with respect to the axial direction of both end parts in the circumferential direction of the small width reducing rate part 16e when viewed in the radial direction.

In this embodiment, the width "H1" of the tip end part 14c of the pole tooth 14b is set to be approximately or substantially ⅓ of the width "H2" of the base end part 14d of the pole tooth 14b. Further, the width "H1" of the tip end part 14c is set to be approximately or substantially 19/50 of the width "H3" of the width reducing rate change part 14g of the pole tooth 14b. Similarly, in this embodiment, the width "H4" of the tip end part 16c of the pole tooth 16b is set to be approximately or substantially ⅓ of the width "H5" of the base end part 16d of the pole tooth 16b. Further, the width "H4" of the tip end part 16c is set to be approximately or substantially 19/50 of the width "H6" of the width reducing rate change part 16g of the pole tooth 16b.

(Arranging Relationship of Pole Teeth and Arranging Relationship between Drive Magnet and Pole Teeth)

Figure 5:
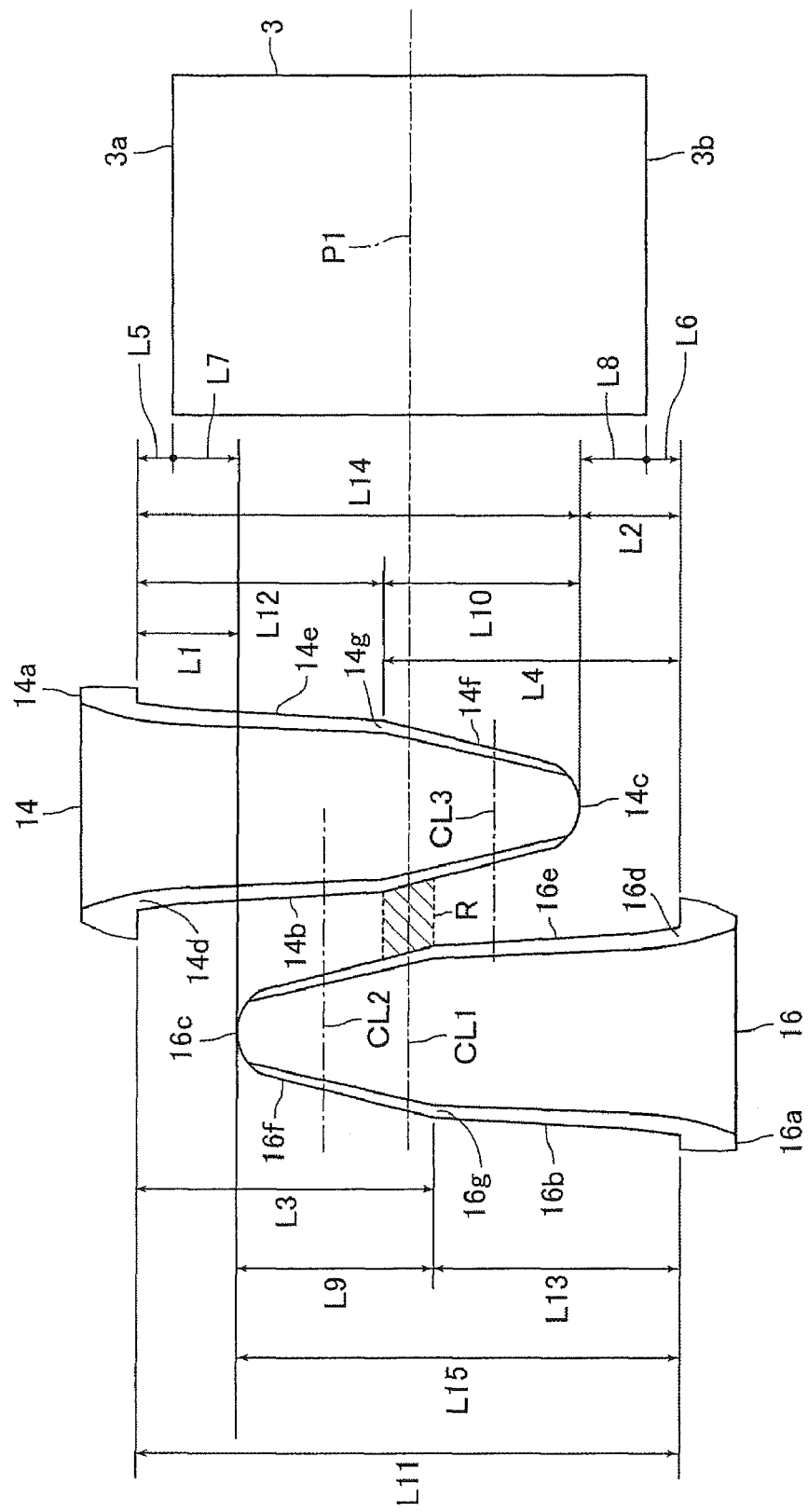
FIG. 5 is an explanatory view showing an arranging relationship between a drive magnet and pole teeth shown in FIG. 1.

FIG. 5 is an explanatory view showing an arranging relationship between the drive magnet 3 and the pole teeth 14b and 16b shown in FIG. 1.

As described above, in this embodiment, the pole tooth 14b of the outer yoke 14 and the pole tooth 16b of the inner yoke 16 are formed to be the same shape as each other. Therefore, in this embodiment, as shown in FIG. 5, the distance "L1" between the base end part 14d of the pole tooth 14b and the tip end part 16c of the pole tooth 16b is set to be equal to the distance "L2" between the base end part 16d of the pole tooth 16 and the tip end part 14c of the pole tooth 14b. Further, the distance "L3" between the width reducing rate change part 16g of the pole tooth 16b and the base end part 14d is set to be equal to the distance "L4" between the width reducing rate change part 14g of pole tooth 14b and the base end part 16d.

Further, in this embodiment, the outer yoke 14 and the inner yoke 16 are disposed in the axial direction in a substantially plane symmetrical manner with respect to the plane "P1" passing through the center of the drive magnet 3 in the axial direction. In other words, the pole teeth 14b and the pole teeth 16b are disposed in a substantially plane symmetrical manner with respect to the plane "P1", and the distance "L5" in the axial direction between one end face 3a of the drive magnet 3 and the base end part 14d is set to be substantially equal to the distance "L6" in the axial direction between the other end face 3b of the drive magnet 3 and the base end part 16d. Therefore, the distance "L7" between the one end face 3a of the drive magnet 3 and the tip end part 16c is set to be substantially equal to the distance "L8" between the other end face 3b of the drive magnet 3 and the tip end part 14c. Further, since the outer yoke 14 and the inner yoke 16 are disposed in a substantially plane symmetrical manner with respect to the plane "P1", the center position "CL1" between the base end part 14d and the base end part 16d in the axial direction is substantially coincided with the position of the plane "P1" in the axial direction. In FIG. 5, the center position "CL1" and the plane "P1" are coincided with each other in the axial direction but the center position "CL1" and the plane "P1" may be slightly displaced from each other in the axial direction.

Further, as shown in FIG. 5, the one end face 3a of the drive magnet 3 is disposed between the base end part 14d and the tip end part 16c in the axial direction, and the other end face 3b of the drive magnet 3 is disposed between the base end part 16d and the tip end part 14c in the axial direction. In this embodiment, the distance "L5" between the one end face 3a of the drive magnet 3 and the base end part 14d is shorter than the distance "L7" between the one end face 3a of the drive magnet 3 and the tip end part 16c. Further, the distance "L6" between the other end face 3b of the drive magnet 3 and the base end part 16d is shorter than the distance "L8" between the other end face 3b of the drive magnet 3 and the tip end part 14c.

In addition, in this embodiment, the width reducing rate change part 14g and the width reducing rate change part 16g are disposed at approximately intermediate positions between the tip end part 14c and the tip end part 16c in the axial direction. In other words, the width reducing rate change part 14g and the width reducing rate change part 16g are disposed at approximately intermediate positions between the base end part 14d and the base end part 16d in the axial direction. Specifically, in the axial direction, the width reducing rate change part 14g is disposed on the base end part 14d side of the pole teeth 14b with respect to the center position "CL1", and the width reducing rate change part 16g is disposed on the base end part 16d side of the pole teeth 16b with respect to the center position "CL1". More specifically, the width reducing rate change part 14g is disposed on the tip end part 14c side of the pole teeth 14b (center position "CL1" side) with respect to the center position "CL2" between the center position "CL1" and the tip end part 16c in the axial direction, and the width reducing rate change part 16g is disposed on the tip end part 16c side of the pole teeth 16b (center position "CL1" side) with respect to the center position "CL3" between the center position "CL1" and the tip end part 14c in the axial direction. Further, as described above, since the pole tooth 14b and the pole tooth 16b are formed to be the same shape as each other, the distance between the width reducing rate change part 14g and the center position "CL1" in the axial direction is equal to the distance between the width reducing rate change part 16g and the center position "CL1" in the axial direction.

In a region between the width reducing rate change part 14g and the width reducing rate change part 16g in the axial direction (specifically, region as shown by the slanted lines in FIG. 5), a space in the circumferential direction between the pole tooth 14b and the pole tooth 16b adjacent to each other in the circumferential direction is set to be narrower than other regions. In other words, the region between the width reducing rate change part 14g and the width reducing rate change part 16g in the axial direction is formed to be a narrow space part "R" where a space in the circumferential direction between the pole tooth 14b and the pole tooth 16b adjacent to each other in the circumferential direction is set to be narrower than other regions. The narrow space part "R" is formed at a substantially center position between the tip end part 14c and the tip end part 16c in the axial direction. In other words, the narrow space part "R" is formed at a substantially center position between the base end part 14d and the base end part 16d in the axial direction.

Further, a distance in the axial direction between the narrow space part "R" and the tip end part 16c is set to be approximately or substantially ⅔ of a distance in the axial direction between the narrow space part "R" and the base end part 14d, and a distance in the axial direction between the narrow space part "R" and the tip end part 14c is set to be approximately or substantially ⅔ of a distance in the axial direction between the narrow space part "R" and the base end part 16d. More specifically, as shown in FIG. 5, in this embodiment, the distance "L9" between the width reducing rate change part 16g and the tip end part 16c in the axial direction is set to be approximately or substantially ⅔ of the distance "L3" between the width reducing rate change part 16g and the base end part 14d in the axial direction. Further, the distance "L10" between the width reducing rate change part 14g and the tip end part 14c in the axial direction is set to be approximately or substantially ⅔ of the distance "L4" between the width reducing rate change part 14g and the base end part 16d in the axial direction.

In this embodiment, for example, the outer yoke 14 is a first yoke and the inner yoke 16 is a second yoke. Further, the end plate part 14a is a first end plate part and the end plate part 16a is a second end plate part, and the pole tooth 14b is a first pole tooth and the pole tooth 16b is a second pole tooth. In addition, the tip end part 14c is a first tip end part and the tip end part 16c is a second tip end part, and the base end part 14d is a first base end part and the base end part 16d is a second base end part. Further, the small width reducing rate part 14e is a first small width reducing rate part and the small width reducing rate part 16e is a second small width reducing rate part, and the large width reducing rate part 14f is a first large width reducing rate part and the large width reducing rate part 16f is a second large width reducing rate part, and the width reducing rate change part 14g is a first width reducing rate change part and the width reducing rate change part 16g is a second width reducing rate change part. Further, the center position "CL1" is a first center position, the center position "CL2" is a second center position, and the center position "CL3" is a third center position.

(Principal Effects in this Embodiment)

As described above, in this embodiment, the distance between the narrow space part "R" and the tip end part 16c in the axial direction is set to be approximately or substantially ⅔ of the distance between the narrow space part "R" and the base end part 14d in the axial direction, and the distance between the narrow space part "R" and the tip end part 14c in the axial direction is set to be approximately or substantially ⅔ of the distance between the narrow space part "R" and the base end part 16d in the axial direction. More specifically, in this embodiment, the distance "L9" between the width reducing rate change part 16g and the tip end part 16c is set to be approximately or substantially ⅔ of the distance "L3" between the width reducing rate change part 16g and the base end part 14d, and the distance "L10" between the width reducing rate change part 14g and the tip end part 14c is set to be approximately or substantially ⅔ of the distance "L4" between the width reducing rate change part 14g and the base end part 16d.

Therefore, while securing facing areas of the pole teeth 14b and 16b and the drive magnet 3 facing each other, the distance "L1" between the base end part 14d and the tip end part 16c and the distance "L2" between the base end part 16d and the tip end part 14c are capable of being relatively increased. Therefore, while securing facing areas of the pole teeth 14b and 16b to the drive magnet 3, the distance "L5" from the one end face 3a of the drive magnet 3 to the base end part 14d, the distance "L7" from the one end face 3a of the drive magnet 3 to the tip end part 16c, the distance "L6" from the other end face 3b of the drive magnet 3 to the base end part 16d, and the distance "L8" from the other end face 3b of the drive magnet 3 to the tip end part 14c are capable of being increased.

As a result, even when the outer yoke 14, the inner yoke 16 (in other words, the end plate parts 14a and 16a and the pole teeth 14b and 16b), the case member 17 and the like are made thinner and facing areas of the pole teeth 14b and 16b to the drive magnet 3 are secured, magnetic saturation in portions of the tip end parts 14c and 16c and the base end parts 14d and 16d where magnetic flux is concentrated is capable of being restrained. In other words, in this embodiment, even when lowering of a torque is restrained by means of that the outer yoke 14, the inner yoke 16, the case member 17 and the like are made thinner to increase the number of turns of the drive coil 5 and that facing areas of the pole teeth 14b and 16b to the drive magnet 3 are secured, magnetic saturation in the portions of the tip end parts 14c and 16c and the base end parts 14d and 16d where magnetic flux is concentrated is capable of being restrained to prevent a linearity characteristic from deteriorating. Therefore, in this embodiment, even when the size of the motor 1 is reduced in the axial direction, deterioration of its performance is restrained. This effect will be described in detail below in Simulations 1 and 2.

In this embodiment, the pole tooth 14b is structured of the small width reducing rate part 14e and the large width reducing rate part 14f, and the pole tooth 16b is structured of the small width reducing rate part 16e and the large width reducing rate part 16f. Therefore, in comparison with a case that the widths of the pole teeth 14b and 16b are reduced from the base end parts 14d and 16d to the tip end parts 14c and 16c with a constant reducing rate, the widths on the base end sides of the pole teeth 14b and 16b can be made wider while the widths on the tip end sides of the pole teeth 14b and 16b are made narrower. Therefore, while restraining deterioration of torque ripples due to effects on the tip end sides of the pole teeth 14b and 16b, magnetic saturation on the base end sides of the pole teeth 14b and 16b is restrained and deterioration of torque ripples due to effects on the base end sides of the pole teeth 14b and 16b is restrained. As a result, deterioration of the linearity characteristic can be restrained effectively.

In this embodiment, the narrow space part "R" is formed at the substantially center position between the tip end part 14c and the tip end part 16c in the axial direction. In other words, the narrow space part "R" is formed at the substantially center position in the axial direction of the drive magnet 3 where magnetic flux density is relatively higher. Therefore, the space in the circumferential direction between the pole tooth 14b and the pole tooth 16b is made narrower at the substantially center position in the axial direction of the drive magnet 3 where magnetic flux density is relatively higher and thus deterioration of a torque characteristic is restrained effectively.

In this embodiment, the pole teeth 14*b* and the pole teeth 16*b* are disposed in a substantially plane symmetrical manner with respect to the plane "P1" which passes through the center of the drive magnet 3 in the axial direction. Therefore, in comparison with a case that the pole teeth 14*b* and the pole teeth 16*b* are disposed in an asymmetrical manner with respect to the plane "P1", a torque ripple is made smaller effectively and deterioration of a linearity characteristic is restrained effectively.

In this embodiment, the width reducing rate change part 14*g* is disposed on the base end part 14*d* side with respect to the center position "CL1" and the width reducing rate change part 16*g* is disposed on the base end part 16*d* side with respect to the center position "CL1". Therefore, in comparison with a case that the width reducing rate change part 14*g* is disposed on the tip end part 14*c* side with respect to the center position "CL1", magnetic saturation is restrained in the portion of the base end part 14*d* where magnetic flux is concentrated. Further, in comparison with a case that the width reducing rate change part 16*g* is disposed on the tip end part 16*c* side with respect to the center position "CL1", magnetic saturation is restrained in the portion of the base end part 16*d* where magnetic flux is concentrated. Therefore, in this embodiment, even when lowering of a torque is restrained by means of that the outer yoke 14, the inner yoke 16, the case member 17 and the like are made thinner to increase the number of turns of the drive coil 5, magnetic saturations in the portions of the base end parts 14*d* and 16*d* where magnetic flux is concentrated are restrained to prevent a linearity characteristic from deteriorating.

In this embodiment, the width reducing rate change part 14*g* is disposed on the tip end part 14*c* side with respect to the center position "CL2" and the width reducing rate change part 16*g* is disposed on the tip end part 16*c* side with respect to the center position "CL3". Therefore, even when the width reducing rate change part 14*g* is disposed on the base end part 14*d* side with respect to the center position "CL1" and the width reducing rate change part 16*g* is disposed on the base end part 16*d* side with respect to the center position "CL1", facing areas of the pole teeth 14*b* and 16*b* to the drive magnet 3 are secured to restrain lowering of a torque.

In this embodiment, the one end face 3*a* of the drive magnet 3 is disposed between the base end part 14*d* and the tip end part 16*c* in the axial direction, and the other end face 3*b* of the drive magnet 3 is disposed between the base end part 16*d* and the tip end part 14*c* in the axial direction. Therefore, the base end part 14*d* and the tip end part 16*c* are disposed in a well-balanced separated manner from the one end face 3*a* of the drive magnet 3 and the base end part 16*d* and the tip end part 14*c* are disposed in a well-balanced separated manner from the other end face 3*b* of the drive magnet 3. Accordingly, in this embodiment, even when the outer yoke 14, the inner yoke 16, the case member 17 and the like are made thinner, magnetic saturations in the portions of the tip end parts 14*c* and 16*c* and the base end parts 14*d* and 16*d* where magnetic flux is concentrated are restrained. Especially, in this embodiment, the tip end parts 14*c* and 16*c* are formed in a convex curved shape and thus concentration of magnetic flux on the tip end parts 14*c* and 16*c* is restrained effectively. As a result, in this embodiment, in order to reduce the size in the axial direction of the motor 1, even when lowering of a torque is restrained by means of that the outer yoke 14, the inner yoke 16, the case member 17 and the like are made thinner to increase the number of turns of the drive coil 5, magnetic saturations in the portions of the tip end parts 14*c* and 16*c* and the base end parts 14*d* and 16*d* where magnetic flux is concentrated are restrained to prevent a linearity characteristic from deteriorating.

In this embodiment, the tip end parts 14*c* and 16*c* are formed in a convex curved shape. Therefore, even when the tip end parts 14*c* and 16*c* are relatively brought close to the one end face 3*a* or the other end face 3*b* of the drive magnet 3, concentration of magnetic flux on the tip end parts 14*c* and 16*c* are restrained. In other words, while increasing facing areas of the pole teeth 14*b* and 16*b* to the drive magnet 3, concentration of magnetic flux on the tip end parts 14*c* and 16*c* is restrained. Therefore, while restraining the magnetic flux concentrations on the tip end parts 14*c* and 16*c*, an effective magnetic circuit is capable of being formed and lowering of a torque is restrained efficiently.

In this embodiment, the distance "L5" between the one end face 3*a* of the drive magnet 3 and the base end part 14*d* is set to be shorter than the distance "L7" between the one end face 3*a* of the drive magnet 3 and the tip end part 16*c*. Further, the distance "L6" between the other end face 3*b* of the drive magnet 3 and the base end part 16*d* is set to be shorter than the distance "L8" between the other end face 3*b* of the drive magnet 3 and the tip end part 14*c*. Therefore, in comparison with a case that the distance "L5" is longer than the distance "L7" and the distance "L6" is longer than the distance "L8", in a case that the length of the drive magnet 3 in the axial direction is constant and the distances "L7" and "L8" are constant, the lengths in the axial direction of the pole teeth 14*b* and 16*b* can be shortened. Accordingly, when the length of the drive magnet 3 in the axial direction is constant and the distances "L7" and "L8" are constant, the size in the axial direction of the motor 1 can be reduced.

Simulation 1

Figure 6:
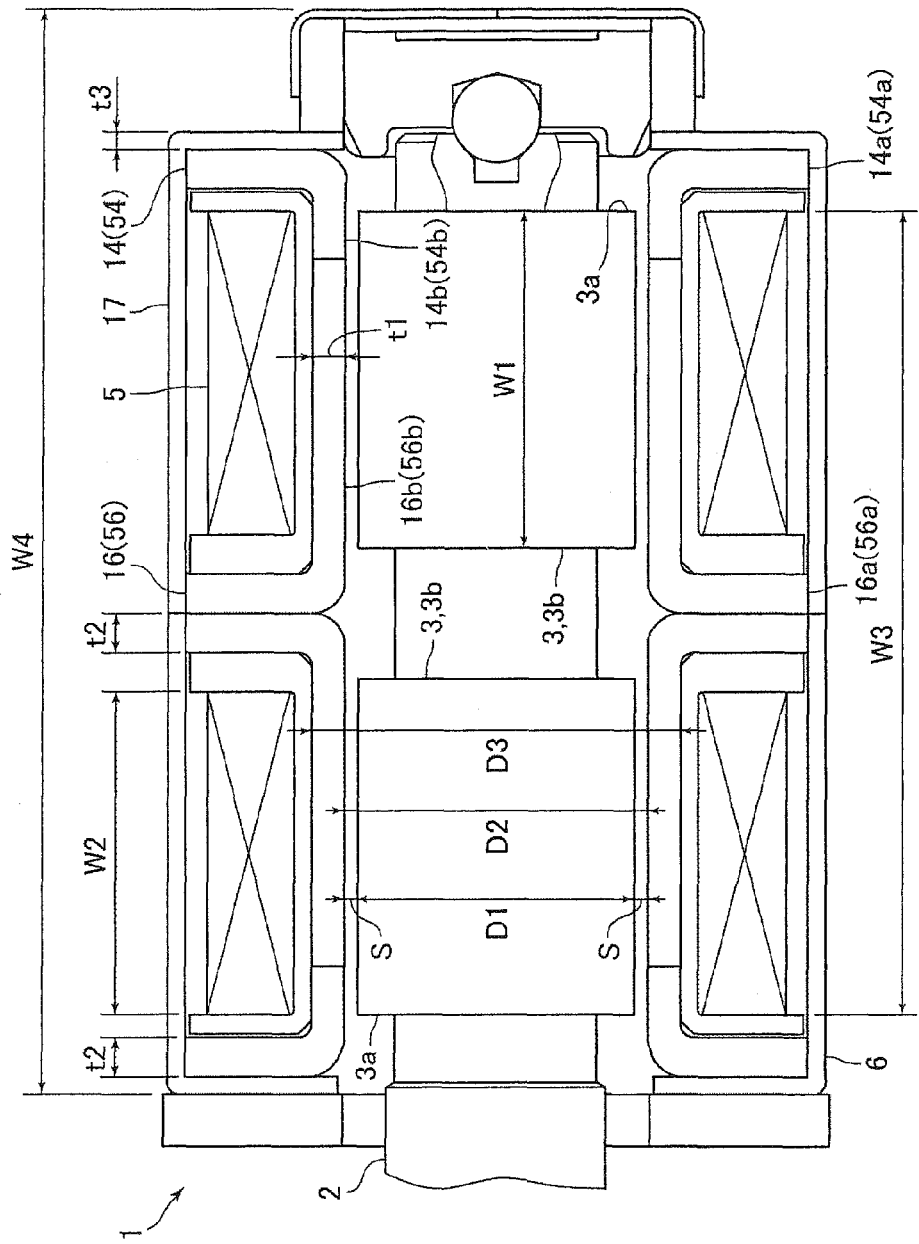
FIG. 6 is a view for explaining conditions of a simulation in which a torque and a torque ripple of a motor are calculated when a distance between a width reducing rate change part and a tip end part shown in FIG. 5 is varied.
Figures 7A, 7B:
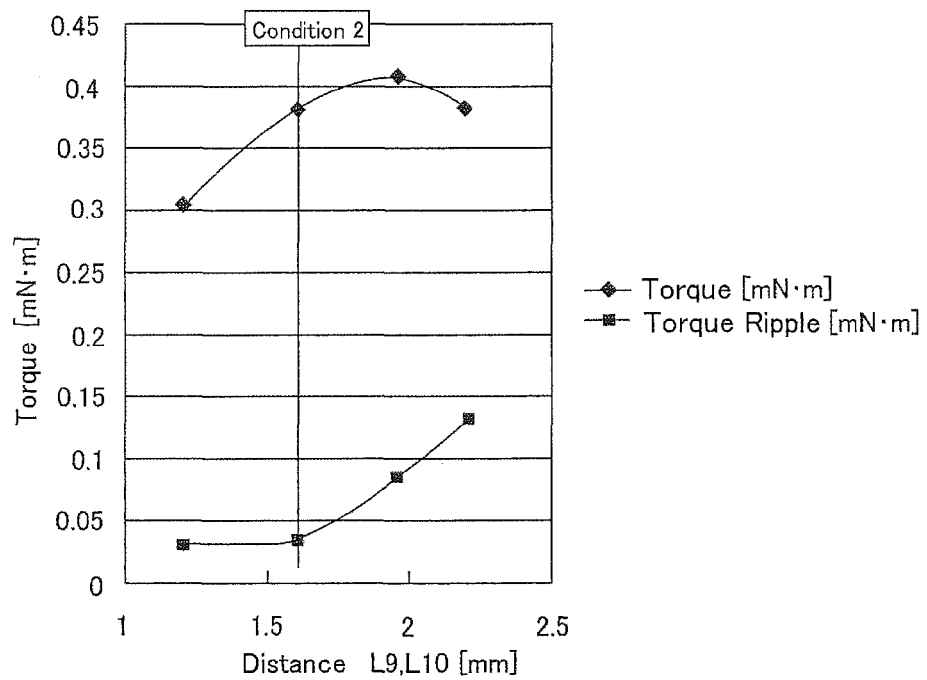
FIG. 7(A) is a graph showing results of a simulation in which a torque and a torque ripple of a motor are calculated when a distance between a width reducing rate change part and a tip end part shown in FIG. 5 is varied.
FIG. 7(B) is a table showing original data for the graph in FIG. 7(A).

FIG. 6 is a view for explaining conditions of a simulation in which a torque and a torque ripple of the motor 1 are calculated when the distance "L9" between the width reducing rate change part 16*g* and the tip end part 16*c* and the distance "L10" between the width reducing rate change part 14*g* and the tip end part 14*c* shown in FIG. 5 are varied. FIG. 7(A) is a graph showing results of a simulation in which a torque and a torque ripple of the motor 1 are calculated when the distance "L9" between the width reducing rate change part 16*g* and the tip end part 16*c* and the distance "L10" between the width reducing rate change part 14*g* and the tip end part 14*c* shown in FIG. 5 are varied. FIG. 7(B) is a table showing original data for the graph in FIG. 7(A).

A simulation is performed in which a torque and a torque ripple of the motor 1 are calculated when the distance "L9" between the width reducing rate change part 16*g* and the tip end part 16*c* and the distance "L10" between the width reducing rate change part 14*g* and the tip end part 14*c* shown in FIG. 5 are varied under a condition that the length "W1" in the axial direction of the drive magnet 3 (see FIG. 6), the distance "L11" between the base end part 14*d* of the pole tooth 14*b* and the base end part 16*d* of the pole tooth 16*b* in the axial direction (see FIG. 5), the distance "L12" between the base end part 14*d* and the width reducing rate change part 14*g* in the axial direction (see FIG. 5), the distance "L13" between the base end part 16*d* and the width reducing rate change part 16*g* in the axial direction (see FIG. 5), the distance "L5" between the one end face 3*a* of the drive magnet 3 and the base end part 14*d*, and the distance "L6" between the other end face 3*b* of the drive magnet 3 and the base end part 16*d* are set to be constant. Specifically, in the simulation, the minimum torque of the motor 1 is calculated when a current value supplied to the drive coil 5 is set to be constant, and the maximum value of variation quantity of a torque (difference between maximum torque and minimum torque) every step of the motor 1 is calculated when a current value supplied to the drive coil 5 is set to be constant. The conditions and results of the simulation will be described below.

The conditions of the simulation are as follows. In the simulation, a torque and a torque ripple of the motor 1 are calculated under the condition that the distances "L12" and "L13" are set to be 2.0 mm and the distances "L9" and "L10" are set in four lengths, i.e., conditions 1 through 4 as shown in FIG. 7(B). Further, in this simulation, respective dimensions shown in FIGS. 2 through 6 are set as follows.

Distances "L3" and "L4": 2.41 mm
Distance "L5": 0.26 mm
Distance "L6": 0.3 mm
Distance "L11": 4.41 mm
Distances "L12" and "L13": 2 mm
Width "H1" of the tip end part 14*c* and width "H4" of the tip end part 16*c*: 0.457 mm
Width "H2" of the base end part 14*d* and width "H5" of the base end part 16*d*: 1.339 mm
Width "H3" of the width reducing rate change part 14*g* and width "H6" of the width reducing rate change part 16*g*: 1.2 mm
Radius of curvature of the tip end parts 14*c* and 16*c*: 0.4 mm
Length "W1" of the drive magnet 3: 3.85 mm
Length "W2" in the axial direction of the drive coil 5: 3.7 mm
Distance "W3" between the one end faces 3*a* of two drive magnets 3: 9.2 mm
Distance "W4" from the output side end of the stator 6 to the opposite-to-output side end of the motor 1: 12.42 mm
Thickness "t1" of the pole teeth 14*b* and 16*b*: 0.37 mm
Thickness "t2" of the end plate parts 14*a* and 16*a*: 0.45 mm
Thickness "t3" of the case member 17: 0.2 mm
Outer diameter "D1" of the drive magnet 3: 3.16 mm
Inner diameter "D2" of the pole teeth 14*b* and 16*b*: 3.46 mm
Outer diameter "D3" of the pole teeth 14*b* and 16*b*: 4.2 mm
Space "S" in the radial direction between the pole teeth 14*b* and 16*b* and the drive magnet 3: 0.15 mm
Outer diameter "φ" of the motor 1: 7.5 mm
Width "W0" of the motor 1: 6 mm "L14" shown in FIG. 5 is a distance from the tip end part 14*c* of the pole tooth 14*b* to the base end part 14*d* (in other words, a length in the axial direction of the pole tooth 14*b*), and "L15" shown in FIG. 5 is a distance from the tip end part 16*c* of the pole tooth 16*b* to the base end part 16*d* (in other words, a length in the axial direction of the pole tooth 16*b*).

Results of the simulation under the conditions described above are shown in FIGS. 7(A) and 7(B). As shown in FIGS. 7(A) and 7(B), in the case of the condition 1 that the distances "L9" and "L10" are 1.2 mm, although the torque ripple is small and the linearity characteristic is satisfactory, the torque is small and the torque characteristic is not satisfactory. Further, in the case of the condition 3 where the distances "L9" and "L10" are 1.96 mm and, in the case of the condition 4 where the distances "L9" and "L10" are 2.2 mm, although the torque is large and the torque characteristic is satisfactory, the torque ripple is large and the linearity characteristic is not satisfactory. On the other hand, in the case of the condition 2 where the distances "L9" and "L10" are 1.6 mm, the torque ripple is small, the torque is large and both of the linearity characteristic and the torque characteristic are satisfactory. In other words, in the case of that the distances "L9" and "L10" are 1.6 mm, the distances "L3" and "L4" are 2.41 mm, the distances "L9" and "L10" are substantially ⅔ of the distances "L3" and "L4", the linearity characteristic and the torque characteristic are satisfactory in a well-balanced manner.

As described above, in the case that the distances "L9" and "L10" are set to be substantially ⅔ of the distances "L3" and "L4", facing areas of the pole teeth 14*b* and 16*b* to the drive magnet 3 are secured and deterioration of the torque characteristic is restrained and, in addition, magnetic saturation in the portions of the tip end parts 14*c* and 16*c* and the base end parts 14*d* and 16*d* where magnetic flux is concentrated is restrained to prevent the linearity characteristic from deteriorating.

Simulation 2

Figure 8:
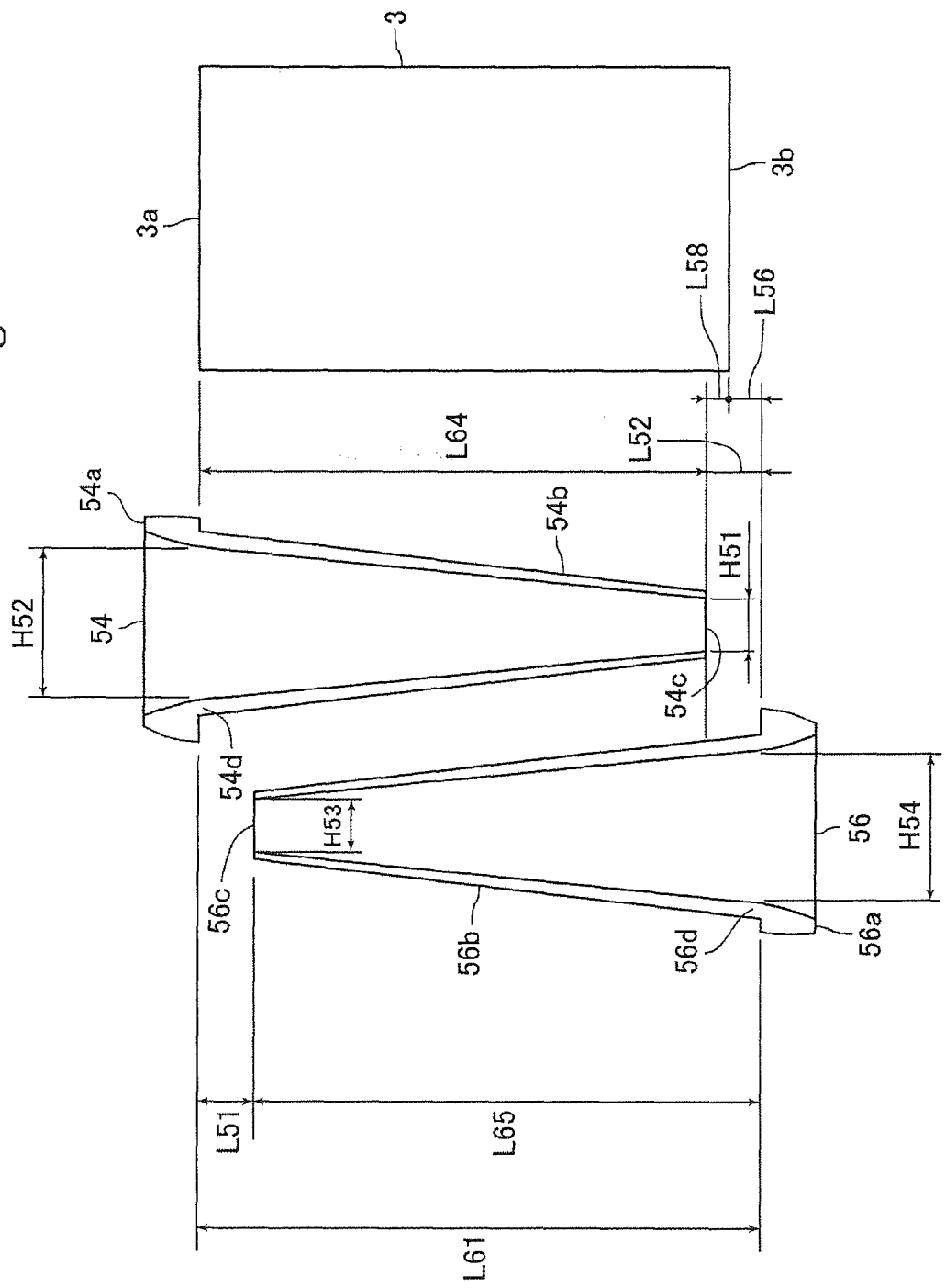
FIG. 8 is an explanatory view showing a structure and an arranging relationship of pole teeth and an arranging relationship between a drive magnet and the pole teeth of a motor in a comparison example.
Figure 9:
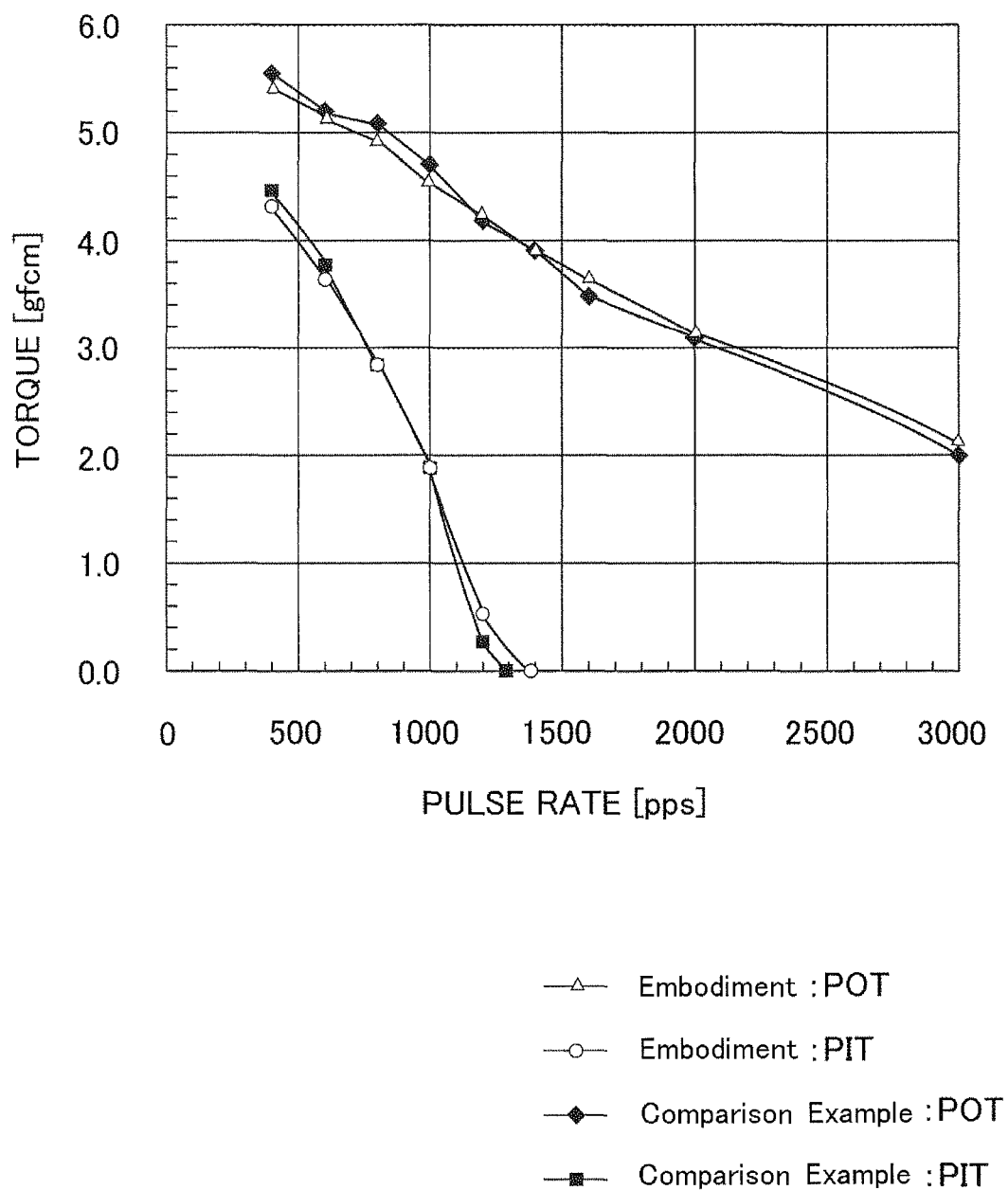
FIG. 9 is a graph showing results of a simulation in which a torque of a motor shown in FIG. 1 and a torque of a motor in a comparison example are calculated.
Figure 10:
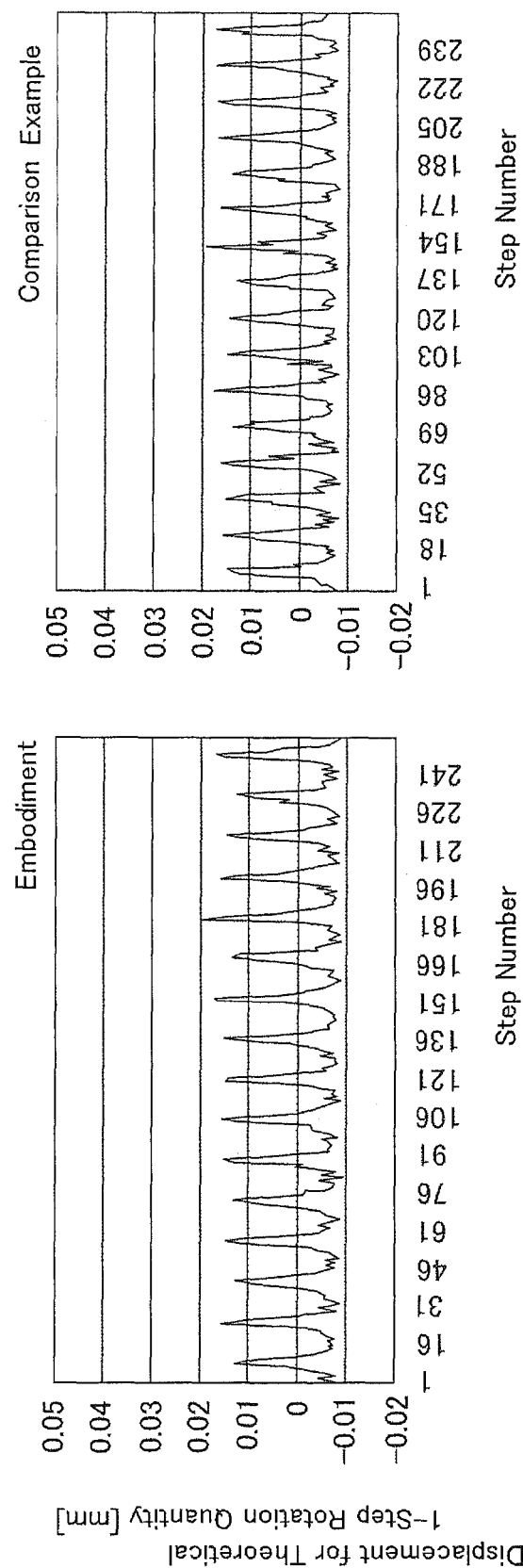
FIG. 10 is graphs showing results of simulations in which a torque ripple of a motor shown in FIG. 1 and a torque ripple of a motor in a comparison example are calculated.

FIG. 8 is an explanatory view showing a structure and an arranging relationship of pole teeth 54*b* and 56*b*, and an arranging relationship between a drive magnet 3 and the pole teeth 54*b* and 56*b* of a motor in a comparison example. FIG. 9 is a graph showing results of a simulation in which a torque of the motor 1 shown in FIG. 1 and a torque of a motor in a comparison example are calculated. FIG. 10 is a graph showing results of the simulation in which a torque ripple of the motor 1 shown in FIG. 1 and a torque ripple of a motor in a comparison example are calculated.

In order to compare a torque and a torque ripple of the motor 1 shown in FIG. 1 (motor 1 in accordance with an embodiment of the present invention) with a torque and a torque ripple of a motor (motor in the comparison example) which is longer in the axial direction than the motor 1, simulations are performed in which a torque and a torque ripple of the motor 1 and a torque and a torque ripple of the motor in the comparison example are calculated. The conditions and results of the simulations will be described below.

First, the conditions of the simulation will be described below. In the simulation, the motor 1 set in the condition 2 of the above-mentioned simulation 1 is used as the motor 1 in accordance with an embodiment of the present invention. Further, as the motor in the comparison example, as shown in FIG. 8, a motor is used in which a space in the circumferential direction between a pole tooth 54*b* of the outer yoke 54 and a pole tooth 56*b* of the inner yoke 56 is constant in the axial direction. Respective dimensions shown in FIGS. 6 and 8 of the motor in the comparison example are set as described below. Except the shapes of the pole teeth 54*b* and 56*b* and the set values described below, the motor in the comparison example and the motor 1 are structured substantially similar to each other. Further, the pole tooth 54*b* and the pole tooth 56*b* are formed to be the same shape as each other. In addition, the tip end part 54*c* of the pole tooth 54*b* and the tip end part 56*c* of the pole tooth 56*b* are formed flatly.

Distance "L51" between the base end part 54*d* of the pole tooth 54*b* and the tip end part 56*c* of the pole tooth 56*b*: 0.5 mm
Distance "L52" between the base end part 56*d* of the pole tooth 56*b* and the tip end part 54*c* of the pole tooth 54*b*: 0.5 mm
Distance between one end face 3*a* of the drive magnet 3 and the base end part 54*d*: 0 mm
Distance "L56" between the other end face 3*b* of the drive magnet 3 and the base end part 56*d*: 0.3 mm
Distance "L58" between the other end face 3*b* of the drive magnet 3 and the tip end part 54*c*: 0.2 mm
Distance "L61" between the base end part 54*d* and the base end part 56*d*: 5.11 mm Length "L64" in the axial direction of the pole tooth 54b and length "L65" in the axial direction of the pole tooth 56b: 4.61 mm Width "H51" of the tip end part 54c and width "H53" of the tip end part 56c: 0.585 mm Width "H52" of the base end part 54d and width "H54" of the base end part 56d: 1.339 mm Length "W1" of the drive magnet 3: 4.81 mm Length "W2" in the axial direction of the drive coil 5: 4.3 mm Distance "W3" between the one end faces 3a of two drive magnets 3: 11.22 mm Distance "W4" from an output side end of the stator 6 to an opposite-to-output side end of the motor 1: 14.42 mm Thickness "t1" of the pole teeth 54b and 56b: 0.45 mm Thickness "t2" of the end plate parts 54a and 56a: 0.5 mm Thickness "t3" of the case member 17: 0.3 mm Outer diameter "D1" of the drive magnet 3: 3.2 mm Inner diameter "D2" of the pole teeth 54b and 56b: 3.5 mm Outer diameter "D3" of the pole teeth 54b and 56b: 4.4 mm Space "S" in the radial direction between the pole teeth 54b and 56b and the drive magnet 3: 0.15 mm Results of the simulation under the above-mentioned conditions are shown in FIGS. 9 and 10. As shown in FIG. 9, a pull-out torque (POT) which is a torque for stopping a rotating rotor 4 of the motor 1 in the embodiment of the present invention is substantially equivalent to that of the motor in the comparison example. Further, as shown in FIG. 9, a pull-in torque (PIT) which is a torque for starting a stopped rotor 4 of the motor 1 in the embodiment of the present invention is substantially equivalent to that of the motor in the comparison example. In addition, as shown in FIG. 10, the torque ripple of motor 1 in the embodiment of the present invention is substantially equivalent to the torque ripple of the motor in the comparison example.

As described above, the motor 1 in which the distances "L9" and "L10" are set to be substantially ⅔ of the distances "L3" and "L4" is shorter in the axial direction by 2 mm than the motor in the comparison example (in other words, the size is reduced by 2 mm in the axial direction). However, the motor 1 is provided with the torque characteristic and the linearity characteristic which are substantially equivalent to the motor in the comparison example. In other words, in the motor 1 where the distances "L9" and "L10" are set to approximately or substantially ⅔ of the distances "L3" and "L4", even when the size of the motor 1 is reduced in the axial direction, facing areas of the pole teeth 14b and 16b to the drive magnet 3 are secured and deterioration of the torque characteristic is restrained and, in addition, magnetic saturation in the portions of the tip end parts 14c and 16c and the base end parts 14d and 16d where magnetic flux is concentrated is restrained to prevent the linearity characteristic from deteriorating.

Other Embodiments

Although the present invention has been shown and described with reference to a specific embodiment, various changes and modifications will be apparent to those skilled in the art from the teachings herein.

In the embodiment described above, as shown in FIG. 1, a part on the output end side of the bearing 7 is disposed in the inside of the stator 6. However, the present invention is not limited to this embodiment. For example, the rotation shaft 2, the bearing 7, the bearing holding member 8 and the flat spring 9 may be structured so that most of the bearing 7 is disposed in the inside of the stator 6. Further, the rotation shaft 2, the bearing 7, the bearing holding member 8 and the flat spring 9 may be structured so that the whole bearing 7 is disposed in the inside of the stator 6 (in other words, the bearing 7 is accommodated into the inside of the stator 6).

In the embodiment described above, the stator 6 is structured of the first stator assembly 12 and the second stator assembly 13. However, the present invention is not limited to this embodiment. For example, the stator 6 may be structured of three or more stator assemblies.

In the embodiment described above, the shape of the motor 1 when viewed in the axial direction is formed in a roughly oval shape. However, the present invention is not limited to this embodiment. For example, the shape of the motor 1 when viewed in the axial direction may be formed in a roughly circular shape.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A stepping motor comprising:
a rotor having a drive magnet; and
a stator having a drive coil, the drive coil being wound in a tube shape and disposed on an outer peripheral side of the drive magnet;
wherein the stator comprises:
a first yoke provided with a first end plate part formed in an approximate ring shape, the first end plate part being disposed so as to cover one end face of the drive coil in an axial direction of the rotor;
a second yoke provided with a second end plate part formed in an approximate ring shape, the second end plate part being disposed so as to cover an other end face of the drive coil in the axial direction;
a plurality of first pole teeth provided in the first yoke, formed to stand up from an inner peripheral end of the first end plate part, and disposed so as to face an outer peripheral face of the drive magnet; and
a plurality of second pole teeth provided in the second yoke, formed to stand up from an inner peripheral end of the second end plate part, and disposed so as to face the outer peripheral face of the drive magnet;
wherein the plurality of the first pole teeth and the plurality of the second pole teeth are alternately disposed in a circumferential direction of the rotor;
wherein a narrow space part where a space becomes narrower in the circumferential direction between the first pole tooth and the second pole tooth adjacent to each other in the circumferential direction is formed at a substantially center position in the axial direction between a first tip end part which is a tip end part of the first pole tooth and a second tip end part which is a tip end part of the second pole teeth;
wherein a distance between the first tip end part and the narrow space part in the axial direction is approximately ⅔ of a distance in the axial direction between a second base end part, which is a base end part of the second pole tooth that is formed at a boundary part between the second end plate part and the second pole tooth, and the narrow space part; and wherein a distance between the second tip end part and the narrow space part in the axial direction is approximately ⅔ of a distance in the axial direction between a first base end part, which is a base end part of the first pole tooth that is formed at a boundary part between the first end plate part and the first pole tooth, and the narrow space part.

2. The stepping motor according to claim 1, wherein the narrow space part is formed at a substantially center position between the first base end part and the second base end part in the axial direction, and a distance in the axial direction between one end face of the drive magnet and the first base end part is substantially equal to a distance in the axial direction between an other end face of the drive magnet and the second base end part.

3. The stepping motor according to claim 1, wherein the stator is provided with a plurality of stator assemblies having the drive coil, the first yoke and the second yoke, and the stator assemblies are disposed so as to superpose on each other in the axial direction.

4. A stepping motor comprising:

a rotor having a drive magnet; and a stator having a drive coil, the drive coil being wound in a tube shape and disposed on an outer peripheral side of the drive magnet;

wherein the stator comprises:

a first yoke provided with a first end plate part formed in an approximate ring shape, the first end plate part being disposed so as to cover one end face of the drive coil in an axial direction of the rotor;

a second yoke provided with a second end plate part formed in an approximate ring shape, the second end plate part being disposed so as to cover an other end face of the drive coil in the axial direction;

a plurality of first pole teeth provided in the first yoke, formed to stand up from an inner peripheral end of the first end plate part, and disposed so as to face an outer peripheral face of the drive magnet;

a plurality of second pole teeth provided in the second yoke, formed to stand up from an inner peripheral end of the second end plate part, and disposed so as to face the outer peripheral face of the drive magnet;

wherein the plurality of the first pole teeth and the plurality of the second pole teeth are alternately disposed in a circumferential direction of the rotor;

wherein the first pole tooth is formed so that a width of the first pole tooth becomes narrower toward a first tip end part, which is a tip end part of the first pole tooth, from a first base end part which is a base end part of the first pole tooth that is formed at a boundary part between the first end plate part and the first pole tooth;

wherein the second pole tooth is formed so that a width of the second pole tooth becomes narrower toward a second tip end part, which is a tip end part of the second pole tooth, from a second base end part which is a base end part of the second pole tooth that is formed at a boundary part between the second end plate part and the second pole tooth;

wherein the first pole tooth comprises:

a first small width reducing rate part which is disposed on a base end side and in which a width of the first pole tooth is reduced toward a tip end side of the first pole tooth with a predetermined reducing rate; and a first large width reducing rate part which is disposed on a tip end side of the first pole tooth and in which the width of the first pole tooth is reduced toward the tip end side of the first pole tooth with a larger reducing rate than the predetermined reducing rate of the first small width reducing rate part;

wherein the second pole tooth comprises:

a second small width reducing rate part which is disposed on a base end side and in which a width of the second pole tooth is reduced toward a tip end side of the second pole tooth with a predetermined reducing rate; and a second large width reducing rate part which is disposed on a tip end side of the second pole tooth and in which the width of the second pole tooth is reduced toward the tip end side of the second pole tooth with a larger reducing rate than the predetermined reducing rate of the second small width reducing rate part;

wherein a first width reducing rate change part, which is a boundary part between the first small width reducing rate part and the first large width reducing rate part, and a second width reducing rate change part, which is a boundary part between the second small width reducing rate part and the second large width reducing rate part, are disposed at approximately intermediate positions in the axial direction between the first tip end part and the second tip end part; and wherein a distance in the axial direction between the first width reducing rate change part and the first tip end part is approximately ⅔ of a distance in the axial direction between the first width reducing rate change part and the second base end part, and a distance in the axial direction between the second width reducing rate change part and the second tip end part is approximately ⅔ of a distance in the axial direction between the second width reducing rate change part and the first base end part.

5. The stepping motor according to claim 4, wherein the first width reducing rate change part and the second width reducing rate change part are disposed at approximately intermediate positions between the first base end part and the second base end part in the axial direction, and a distance in the axial direction between the one end face of the drive magnet and the first base end part is substantially equal to a distance in the axial direction between the other end face of the drive magnet and the second base end part.

6. The stepping motor according to claim 4, wherein the stator is provided with a plurality of stator assemblies having the drive coil, the first yoke and the second yoke, and the stator assemblies are disposed so as to superpose on each other in the axial direction.

7. A stepping motor comprising:

a rotor having a drive magnet; and a stator having a drive coil, the drive coil being wound in a tube shape and disposed on an outer peripheral side of the drive magnet;

wherein the stator comprises:

a first yoke provided with a first end plate part formed in an approximate ring shape, the first end plate part being disposed so as to cover one end face of the drive coil in an axial direction of the rotor;

a second yoke provided with a second end plate part formed in an approximate ring shape, the second end plate part being disposed so as to cover an other end face of the drive coil in the axial direction;

a plurality of first pole teeth provided in the first yoke, formed to stand up from an inner peripheral end of the first end plate part, and disposed so as to face an outer peripheral face of the drive magnet;

a plurality of second pole teeth provided in the second yoke, formed to stand up from an inner peripheral end of the second end plate part, and disposed so as to face the outer peripheral face of the drive magnet;

wherein the plurality of the first pole teeth and the plurality of the second pole teeth are alternately disposed in a circumferential direction of the rotor;

wherein the first pole tooth is formed so that a width of the first pole tooth becomes narrower toward a first tip end part, which is a tip end part of the first pole tooth, from a first base end part which is a base end part of the first pole tooth that is formed at a boundary part between the first end plate part and the first pole tooth;

wherein the second pole tooth is formed so that a width of the second pole tooth becomes narrower toward a second tip end part, which is a tip end part of the second pole tooth, from a second base end part which is a base end part of the second pole tooth that is formed at a boundary part between the second end plate part and the second pole tooth;

wherein the first pole tooth comprises:
  a first small width reducing rate part which is disposed on a base end side and in which a width of the first pole tooth is reduced toward a tip end side of the first pole tooth with a predetermined reducing rate; and
  a first large width reducing rate part which is disposed on a tip end side of the first pole tooth and in which the width of the first pole tooth is reduced toward the tip end side of the first pole tooth with a larger reducing rate than the predetermined reducing rate of the first small width reducing rate part;

wherein the second pole tooth comprises:
  a second small width reducing rate part which is disposed on a base end side and in which a width of the second pole tooth is reduced toward a tip end side of the second pole tooth with a predetermined reducing rate; and
  a second large width reducing rate part which is disposed on a tip end side of the second pole tooth and in which the width of the second pole tooth is reduced toward the tip end side of the second pole tooth with a larger reducing rate than the predetermined reducing rate of the second small width reducing rate part;

wherein a first width reducing rate change part which is a boundary part between the first small width reducing rate part and the first large width reducing rate part is disposed on a first base end part side with respect to a first center position which is a center position between the first base end part and the second base end part in the axial direction; and wherein a second width reducing rate change part which is a boundary part between the second small width reducing rate part and the second large width reducing rate part is disposed on a second base end part side with respect to the first center position.

8. The stepping motor according to claim 7, wherein
the first width reducing rate change part is disposed on a first tip end part side with respect to a second center position which is a center position between the first center position and the second tip end part in the axial direction, and the second width reducing rate change part is disposed on a second tip end part side with respect to a third center position which is a center position between the first center position and the first tip end part in the axial direction.

9. The stepping motor according to claim 7, wherein a region in the axial direction between the first width reducing rate change part and the second width reducing rate change part is a narrow space part where a space in the circumferential direction between the first pole tooth and the second pole tooth adjacent to each other in the circumferential direction is narrower.

10. The stepping motor according to claim 7, wherein
a distance in the axial direction between the first width reducing rate change part and the first tip end part is approximately $2/3$ of a distance in the axial direction between the first width reducing rate change part and the second base end part, and a distance in the axial direction between the second width reducing rate change part and the second tip end part is approximately $2/3$ of a distance in the axial direction between the second width reducing rate change part and the first base end part.

11. The stepping motor according to claim 7, wherein
a distance in the axial direction between the first width reducing rate change part and the first center position is substantially equal to a distance in the axial direction between the second width reducing rate change part and the first center position, and a distance in the axial direction between one end face of the drive magnet and the first base end part is substantially equal to a distance in the axial direction between an other end face of the drive magnet and the second base end part.

12. The stepping motor according to claim 7, wherein
one end face of the drive magnet in the axial direction is disposed between the first base end part and the second tip end part in the axial direction, an other end face of the drive magnet in the axial direction is disposed between the second base end part and the first tip end part in the axial direction, and the first tip end part and the second tip end part are formed in a convex curved shape.

13. The stepping motor according to claim 7, wherein
one end face of the drive magnet in the axial direction is disposed between the first base end part and the second tip end part in the axial direction, a distance in the axial direction between the one end face of the drive magnet and the first base end part is shorter than a distance in the axial direction between the one end face of the drive magnet and the second tip end part, an other end face of the drive magnet in the axial direction is disposed between the second base end part and the first tip end part in the axial direction, and a distance in the axial direction between the other end face of the drive magnet and the second base end part is shorter than a distance in the axial direction between the other end face of the drive magnet and the first tip end part.

14. The stepping motor according to claim 7, wherein
one end face of the drive magnet in the axial direction is disposed between the first base end part and the second tip end part in the axial direction, an other end face of the drive magnet in the axial direction is disposed between the second base end part and the first tip end part in the axial direction, a distance in the axial direction between the first base end part and the second tip end part is substantially equal to a distance in the axial direction between the second base end part and the first tip end part, and a distance in the axial direction between the one end face of the drive magnet and the first base end part is substantially equal to a distance in the axial direction between the other end face of the drive magnet and the second base end part.

15. The stepping motor according to claim 7, wherein the stator is provided with a plurality of stator assemblies having the drive coil, the first yoke and the second yoke, and the stator assemblies are disposed so as to superpose on each other in the axial direction.

* * * * *